US006597650B2

(12) United States Patent
Katakura et al.

(10) Patent No.: US 6,597,650 B2
(45) Date of Patent: Jul. 22, 2003

(54) NONLINEARITY COMPENSATION CIRCUIT AND METHOD, CONTROL CIRCUIT AND METHOD FOR NONLINEARITY COMPENSTATION CIRCUIT AND RECORDING AND/OR PLAYBACK APPARATUS EMPLOYING THE SAME

(75) Inventors: Masayuki Katakura, Kanagawa (JP); Junkichi Sugita, Kanagawa (JP); Norio Shoji, Kanagawa (JP); Masato Sekine, Kanagawa (JP); Kimimasa Senba, Kanagawa (JP); Katsuhisa Daio, Kagoshima (JP)

(73) Assignee: Sony Corporation (JP)

( * ) Notice: Subject to any disclaimer, the term of this patent is extended or adjusted under 35 U.S.C. 154(b) by 178 days.

(21) Appl. No.: 09/870,714

(22) Filed: Jun. 1, 2001

(65) Prior Publication Data

US 2002/0053935 A1 May 9, 2002

(30) Foreign Application Priority Data

Jun. 8, 2000 (JP) ....................................... 2000-171699

(51) Int. Cl.[7] ................................................. G11B 7/00
(52) U.S. Cl. ............... 369/59.22; 369/59.1; 369/124.01
(58) Field of Search ............................. 369/47.1, 47.19, 369/53.1, 59.1, 59.15, 59.16, 59.22, 59.23, 59.26, 124.01

(56) References Cited

U.S. PATENT DOCUMENTS

| | | | | |
|---|---|---|---|---|
| 6,249,890 B1 | * | 6/2001 | Ukani et al. | 360/53 |
| 6,377,529 B1 | * | 4/2002 | Lee et al. | 369/59.1 |

FOREIGN PATENT DOCUMENTS

| | | |
|---|---|---|
| JP | 9-134501 | 5/1997 |
| JP | 11-507157 | 6/1999 |
| WO | 96/37882 | 11/1996 |

* cited by examiner

*Primary Examiner*—Muhammad Edun
(74) *Attorney, Agent, or Firm*—Rader, Fishman & Grauer PLLC; Ronald P. Kananen

(57) ABSTRACT

A nonlinearity compensation circuit is disclosed which includes an inverse hyperbolic function generation circuit for converting differential currents corresponding to input signals in+ and in− into differential voltages which increase in proportion to an inverse hyperbolic function, an offset provision circuit for providing an offset corresponding to control signals c+ and c− to the differential voltages outputted from the inverse hyperbolic function generation circuit and a hyperbolic function generation circuit for converting the differential voltages to which the offset has been provided by the offset provision circuit into signals which increase in proportion to a hyperbolic function and outputting the resulting signals as output signals out+ and out−. Consequently, compensation for the nonlinearity such as second order distortion can be performed for the read signal from a recording medium.

29 Claims, 17 Drawing Sheets

NONLINEARITY COMPENSATION CIRCUIT AND METHOD, CONTROL CIRCUIT AND METHOD FOR NONLINEARITY COMPENSTATION CIRCUIT AND RECORDING AND/OR PLAYBACK APPARATUS EMPLOYING THE SAME

BACKGROUND OF THE INVENTION

The present invention relates to a nonlinearity compensation circuit and method, a control circuit and method for a nonlinearity compensation circuit, and a recording and/or playback apparatus which use the same, and more particularly to a nonlinearity compensation circuit and method for compensating for the nonlinearity of a read signal read from a recording medium, a control circuit and method for controlling a compensation amount of the nonlinearity compensation circuit, and a recording and/or playback apparatus which uses the nonlinearity compensation circuit and the control circuit in a signal processing system for the read signal.

In recent years, attention has been focused on a signal processing system called PRML (Partial Response Maximum Likelihood) for a recording and/or playback apparatus such as a digital magnetic recording and/or playback apparatus or a digital optical disk apparatus. The PRML signal processing system is a technique which can raise the recording density to 1.2 to 1.5 times through signal processing without modifying an existing recording and/or playback system extensively.

In a recording and/or playback system of the PRML signal processing system, a magnetic head, an optical pickup or a like element is used as a reading member for reading recorded information from a recording medium. Recently, a magneto-resistive head which makes use of a magneto resistance effect such as an MR head or a GMR head is used frequently as a magnetic head. The reason for this is that the magneto resistive head is higher in playback sensitivity and more suitable for high density recording than a conventional head of the inductor type.

However, the magneto resistive head generates second order distortion from its characteristic. Accordingly, a playback waveform of the magneto resistive head exhibits vertical asymmetry, and this restricts the recording density. Particularly, the PRML signal processing system which positively makes use of waveform interference is influenced significantly by a vertically asymmetrical playback waveform and cannot perform equalization well. In order to eliminate the problem, a circuit which makes use of polygonal approximation to perform nonlinearity compensation (refer to, for example, Published Japanese Translation of PCT No. 507157/1999) and another circuit which uses a squaring unit to perform nonlinearity compensation (refer to, for example, Japanese Patent Laid-Open No. 134501/1997) have been proposed conventionally.

However, the former circuit is disadvantageous in that it exhibits significant residual distortion. Meanwhile, the latter circuit is disadvantageous in that the circuit configuration is complicated and newly generates large amounts of third order distortion. Further, a control circuit for a nonlinearity compensation circuit does not control the nonlinearity compensation circuit based on a clear criterion and does not achieve optimum control. Besides, since the control circuit is configured so as to utilize error information of an equalizer or the like, it involves a comparatively large loop and cannot be designed so as to have a high degree of stability.

SUMMARY OF THE INVENTION

It is an object of the present invention to provide a nonlinearity compensation circuit and method, a control circuit and method for a nonlinearity compensation circuit, and a recording and/or playback apparatus wherein second order distortion can be removed sufficiently with a simple circuit configuration and such ill effects as third order distortion do not occur.

In order to attain the object described above, according to an aspect of the present invention, there is provided a nonlinearity compensation circuit, comprising compensation means for compensating for the nonlinearity of an input signal in response to a control signal, and characteristic provision means for providing an input/output characteristic represented by a function of $$y=(x+c)/(1+cx)$$

where x is the input signal, c is the control signal, and y is the output signal, and ≡x, c≡≦1.

With the nonlinearity compensation circuit, the nonlinearity of an input signal to the nonlinearity compensation circuit is compensated for in accordance with the input/output characteristic represented by the function given above. Therefore, the nonlinearity of the input signal can be removed simply and sufficiently. Besides, such nonlinearity compensation can be performed without ill effects such as third order distortion. As a result, where the nonlinearity compensation circuit is applied to a recording and/or playback apparatus which records information onto a recording medium, the recording density can be improved.

According to another aspect of the present invention, there is provided a control circuit for a nonlinearity compensation circuit which compensates for the nonlinearity of an input signal, comprising measurement means for measuring a first time and a second time within which the waveform of the input signal has a positive value and a negative value with respect to a reference level, respectively, and control means for controlling the nonlinearity compensation circuit based on a difference between the first time and the second time measured by the measurement means.

With the control circuit for a nonlinearity compensation circuit, the first and second times within which the waveform of the input signal has a positive value and a negative value with respect to a reference level, respectively, are measured, and the compensation amount for the nonlinearity compensation circuit is controlled based on a difference between the first and second times. Consequently, the distortion amount of the input signal can be grasped with a maximum sensitivity and can be compensated for well. Accordingly, a system can be constructed in a self-complete fashion. Besides, a loop can be formed compact, and consequently, the control circuit and hence the nonlinearity compensation circuit can operate stably and on the real-time basis when it is actually used.

The nonlinearity compensation circuit and the control circuit for a nonlinearity compensation circuit can be incorporated suitably in a recording and/or playback apparatus for reading recorded information from a recording medium such as a magnetic disk, a magnetic tape or an optical disk and used as a compensation circuit for compensating for the nonlinearity of a read signal read from the recording medium and a control circuit for controlling the nonlinearity compensation amount by the compensation circuit, respectively.

In particular, according to a further aspect of the present invention, there is provided a recording and/or playback apparatus, comprising reading means for reading recorded information from a recording medium, a nonlinearity compensation circuit for compensating for the nonlinearity of a read signal read by the reading means, and a control circuit for controlling a compensation amount of the nonlinearity compensation circuit, the control circuit including measurement means for measuring a first time and a second time within which the waveform of the read signal has a positive value and a negative value with respect to a reference level, respectively, and control means for controlling the nonlinearity compensation circuit based on a difference between the first time and the second time measured by the measurement means.

With the recording and/or playback apparatus, the first and second times within which the waveform of the read signal has a positive value and a negative value with respect to a reference level, respectively, are measured, and the compensation amount for the nonlinearity compensation circuit is controlled based on a difference between the first and second times. Consequently, the distortion amount of the read signal can be grasped with a maximum sensitivity and can be compensated for well. Accordingly, a system can be constructed in a self-complete fashion. Besides, a loop can be formed compact, and consequently, the recording and/or playback apparatus can operate stably and on the real-time basis when it is actually used.

Where the nonlinearity compensation circuit is incorporated in the recording and/or playback apparatus, the nonlinearity of the read signal is compensated for in accordance with the input/output characteristic represented by the function given hereinabove. Therefore, the nonlinearity of the input signal can be removed simply and sufficiently. Besides, such nonlinearity compensation can be performed without ill effects such as third order distortion. As a result, the recording density can be improved.

The above and other objects, features and advantages of the present invention will become apparent from the following description and the appended claims, taken in conjunction with the accompanying drawings in which like parts or elements are denoted by like reference symbols.

DETAILED DESCRIPTION OF THE PREFERRED EMBODIMENTS

Figure 1:
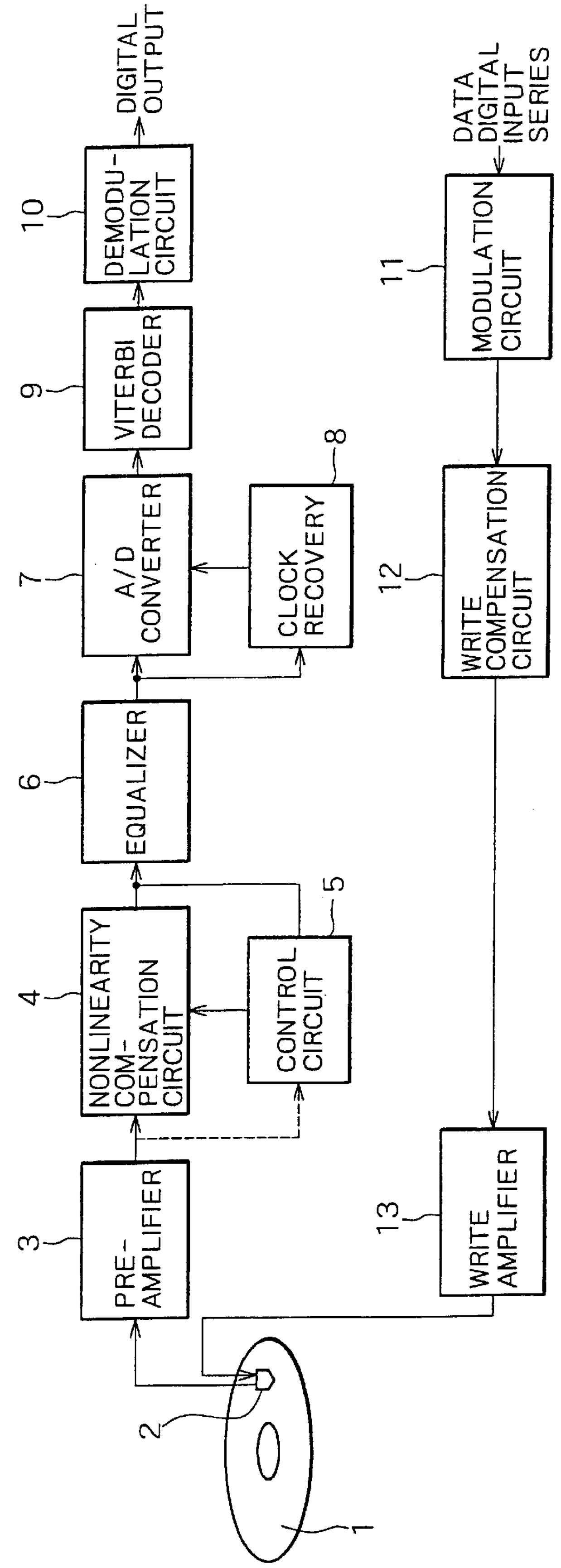
FIG. 1 is a block diagram showing an example of a configuration of a high density recording and/or playback apparatus which adopts a common PRML system and to which the present invention is applied.

Referring first to FIG. 1, there is shown an example of configuration of a high density recording and/or playback apparatus which adopts a common PRML system and to which the present invention is applied. The high density recording and/or playback apparatus which adopts a PRML system may be a recording and/or playback apparatus such as a magnetic disk apparatus, a magnetic tape apparatus or an optical disk apparatus.

Referring to FIG. 1, recorded information on a recording medium 1 such as a magnetic disk, a magnetic tape, an optical disk is read by a reading element (hereinafter referred to as head section 2) such as a magnetic head or an optical head (optical pickup). A read signal read by the head section 2 is supplied to a nonlinearity compensation circuit 4 through a preamplifier 3. The compensation amount of the nonlinearity compensation circuit 4 is controlled by a control circuit 5. The nonlinearity compensation circuit 4 and the control circuit 5 are characteristic elements of the present invention, and details of them are hereinafter described.

The read signal having undergone nonlinearity compensation by the nonlinearity compensation circuit 4 is subject to compensation of the frequency characteristic by an equalizer 6 and is supplied to an A/D converter 7 and a clock recovery circuit 8. The clock recovery circuit 8 produces a clock synchronized with the read signal based on the read signal from the equalizer 6. The clock produced by the clock recovery circuit 8 is supplied as a sampling clock to the A/D converter 7.

The A/D converter 7 samples the read signal in synchronism with the sampling clock supplied from the clock recovery circuit 8 to convert the read signal into digital data. The digital data obtained by the A/D conversion by the A/D converter 7 is subject to viterbi decoding by a viterbi decoder 9, and then is subject to demodulation by a demodulation circuit 10 and then outputted.

On the other hand, in a recording system (writing system), data (a digital input series) is modulated by a modulation circuit 11, and is subject to write compensation by a write compensation circuit 12 and is supplied to the head section 2 through a write amplifier 13. Then, the data is written onto the recording medium 1 by the head section 2.

Figure 2:
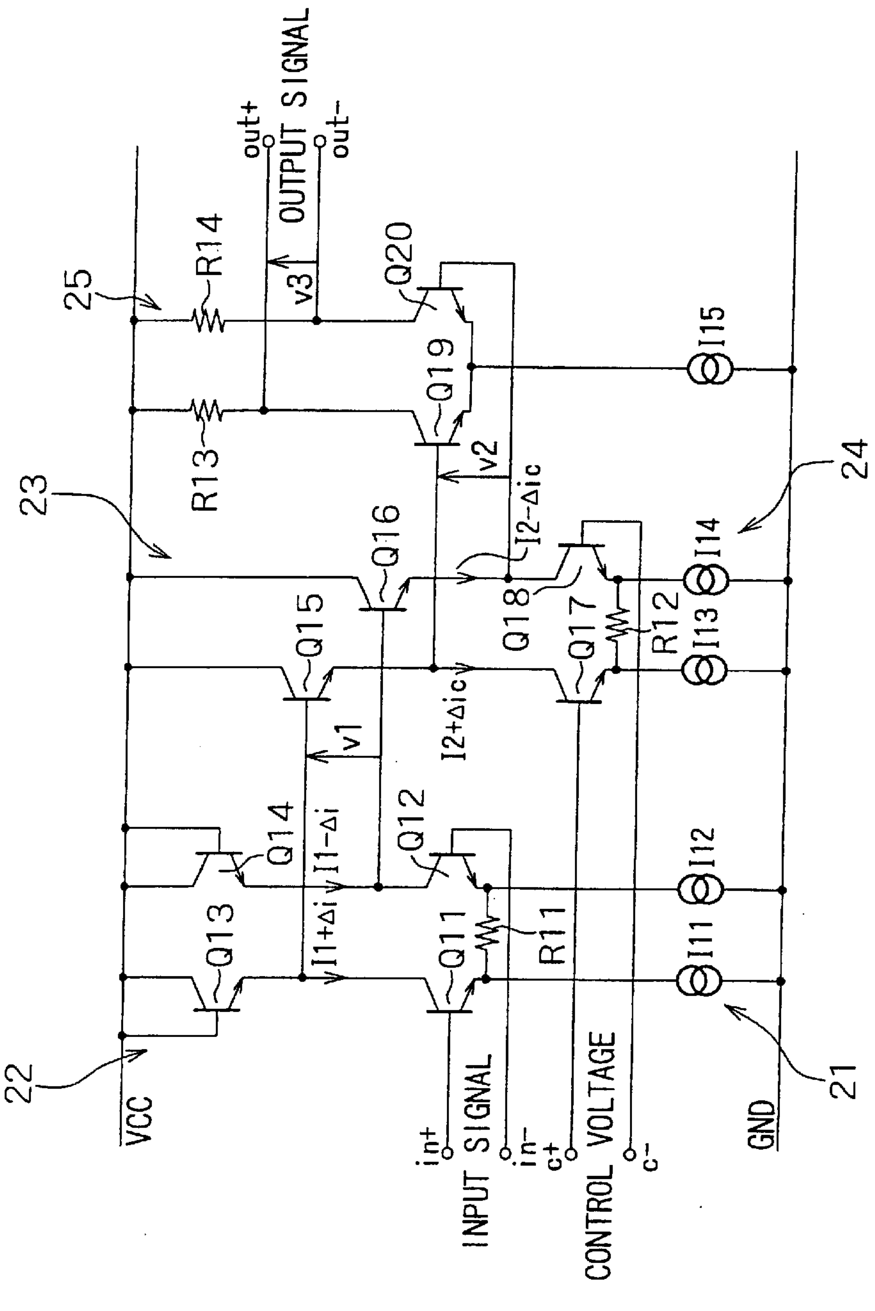
FIG. 2 is a circuit diagram showing a circuit configuration of a nonlinearity compensation circuit to which the present invention is applied.

FIG. 2 is a circuit diagram showing a circuit configuration of the nonlinearity compensation circuit according to which the present invention is applied. The nonlinearity compensation circuit according to the present embodiment includes a voltage-current conversion circuit 21, an inverse hyperbolic function generation circuit 22, an offset provision circuit 23, another voltage-current conversion circuit 24, and a hyperbolic function generation circuit 25.

The voltage-current conversion circuit 21 includes npn differential pair transistors Q11 and Q12, a resistor R11 connected between the emitters of the transistor Q11 and Q12, current sources I11 and I12 connected between the emitters of the differential pair transistor Q11 and Q12 and the ground, respectively. In the following, unless otherwise specified, an npn transistor is used as a transistor. The voltage-current conversion circuit 21 converts input signals (voltages) in+ and in− to be applied to the bases of the differential pair transistors Q11 and Q12 into a pair of differential currents.

The inverse hyperbolic function generation circuit 22 includes transistors Q13 and Q14 connected between the collectors of the differential pair transistors Q11 and Q12 and a power supply VCC. The transistors Q13 and Q14 are connected in diode connection with the collectors and the bases thereof coupled commonly. The inverse hyperbolic function generation circuit 22 converts the pair of differential currents obtained by the voltage-current conversion circuit 21 into differential voltages which increase in proportion to an inverse hyperbolic function by diode compression.

The offset provision circuit 23 includes transistors Q15 and Q16 of an emitter-follower wherein the bases are connected to the collectors of the differential pair transistors Q11 and Q12 and the collectors are connected to the power supply VCC. The offset provision circuit 23 applies an offset to the differential voltages obtained by the conversion by the inverse hyperbolic function generation circuit 22 in response to control voltages c+ and c− supplied from the control circuit 5 (refer to FIG. 1) to the voltage-current conversion circuit 24.

The voltage-current conversion circuit 24 includes differential pair transistors Q17 and Q18 wherein the collectors are connected to the emitters of the transistors Q15 and Q16 of the emitter-follower, a resistance R12 connected between the emitters of the transistors Q17 and Q18, and current sources I13 and I14 connected between the emitters of the differential pair transistors Q17 and Q18 and the ground. The voltage-current conversion circuit 24 converts the control voltages c+ and c− applied to the bases of the differential pair transistor Q17 and Q18 into differential currents.

The hyperbolic function generation circuit 25 includes differential pair transistors Q19 and Q20 wherein the bases are connected to the emitters of the transistor Q15 and Q16 and the emitters are connected commonly, resistances R13 and R14 connected between the collectors of the transistors Q19 and Q20 and the power supply VCC, respectively, a current source I15 connected between the emitter common connection point of the differential pair transistor Q19 and Q20 and the ground. The hyperbolic function generation circuit 25 converts the differential voltages to which the offset has been applied by the offset provision circuit 23 into differential voltages which increase in proportion to a hyperbolic function and outputs them as output signals out+ and out− from the collectors of the differential transistor Q19 and Q20.

In the following, circuit operation of the nonlinearity compensation circuit according to the first embodiment having the configuration described above is described.

The input voltages in+ and in− are converted into a pair of differential currents I1+Δi and I1−Δi by the voltage-current conversion circuit 21, respectively, and the resulting currents are converted into differential voltages which increase in proportion to the inverse hyperbolic function by the diodes (Q13 and Q14) of the inverse hyperbolic function generation circuit 22. In the process just described, a potential difference v1 which appears between the collectors of the differential pair transistors Q11 and Q12 is given by:

$$\begin{aligned} v1 &= Vt\cdot\ln\{(I1+\Delta i)/(I1-\Delta i)\} \\ &= Vt\cdot\ln\{(1+x)/(1-x)\} \\ &= 2Vt\cdot\tanh^{-1}(x) \end{aligned}$$

The potential difference v1 is shifted by an amount which increases in proportion to a logarithm of a ratio between the control voltages c+ and c− by the offset provision circuit 23. Consequently, the offset corresponding to the control voltages c+ and c− is applied to the differential voltages which increase in proportion to the inverse hyperbolic function. In the process just described, where the collector currents of the differential pair transistors Q17 and Q18 are represented by I2+Δic and I2−Δic, respectively, the electric potential difference v2 between the emitters of the transistors Q15 and Q16 is represented by the following expression:

$$\begin{aligned} v2 &= v1 + Vt\cdot\ln\{(I2+\Delta ic)/(I2-\Delta ic)\} \\ &= v1 + Vt\cdot\ln\{(1+C)/(1-C)\} \\ &= 2Vt\cdot\tanh^{-1}(x) + 2Vt\cdot\tanh^{-1}(c) \\ &= 2Vt\cdot\tanh^{-1}\{(x+c)/(1+cx)\} \end{aligned}$$

where x and c represent values which increase in proportion to the input signals in+ and in− and the control voltages c+ and c−, respectively, and range from −1 to 1, that is, ≡x and c≡≦1.

Then, the hyperbolic function generation circuit 25 applies a tanh function to the potential difference v2 to obtain a final output voltage v3 given by the following expression:

$$\begin{aligned} V3 &= \tanh(v2/2Vt) \\ &= \tanh[\tanh^{-1}\{(x+c)/(1+cx)\}] \\ &= (x+c)/(1+cx) \end{aligned}$$

Where the input signal is represented by x, the control signal by c, and the output signal by y, the nonlinearity compensation circuit has an input-output characteristic represented by a form of a function of $$y=(x+c)/(1+cx)$$

where ≡x, c≡≦1. The input signal x and the control signal c can replace each other because the function form is symmetrical with regard to the input signal x and the control signal c. If the input signal x and the control signal c are supplied originally as differential currents, naturally the voltage-current conversion circuits 21 and 24 may be omitted.

Figure 3:
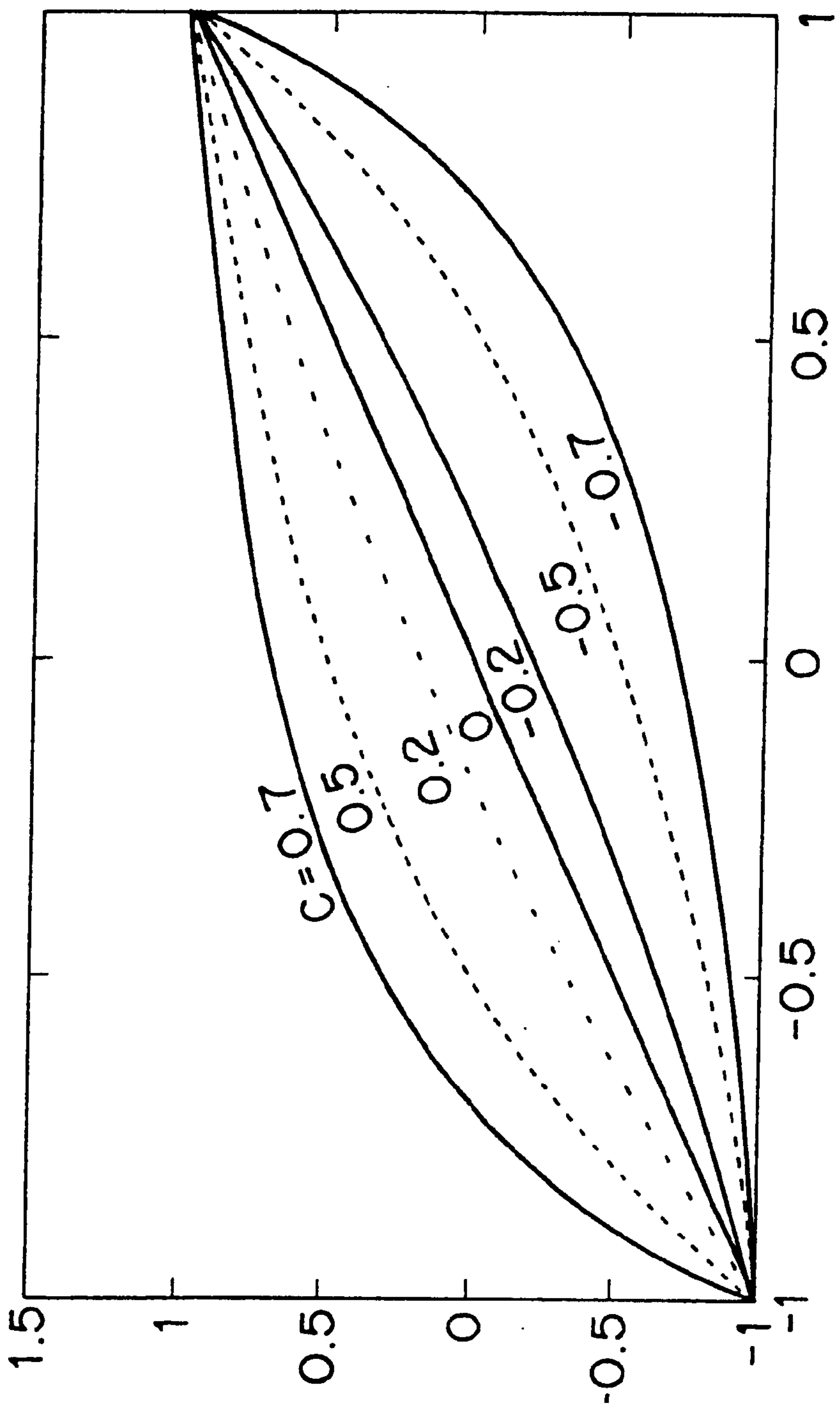
FIG. 3 is a diagram illustrating an input/output characteristic of the nonlinearity compensation circuit shown in FIG. 2.

FIG. 3 illustrates input-output characteristics of the nonlinearity compensation circuit when the control signal c is set to 0, 0.2, 0.5, and 0.7. It can be recognized from the input-output characteristic diagram of FIG. 3 that, as the absolute value of the control signal c increases, the characteristic varies to a curve of an increasing curvature and therefore the nonlinearity can be corrected (compensated for). The nonlinearity compensation circuit can theoretically cope with any distortion rate. Practically, the distortion can be corrected by the distortion rate of 40% or more.

In the nonlinearity compensation circuit according to the first embodiment, the offset provision circuit 23 formed from the transistors Q15 and Q16 of the emitter follower is used as means for providing an offset. However, the means described is not limited to the specific provision circuit 23.

Figure 4:
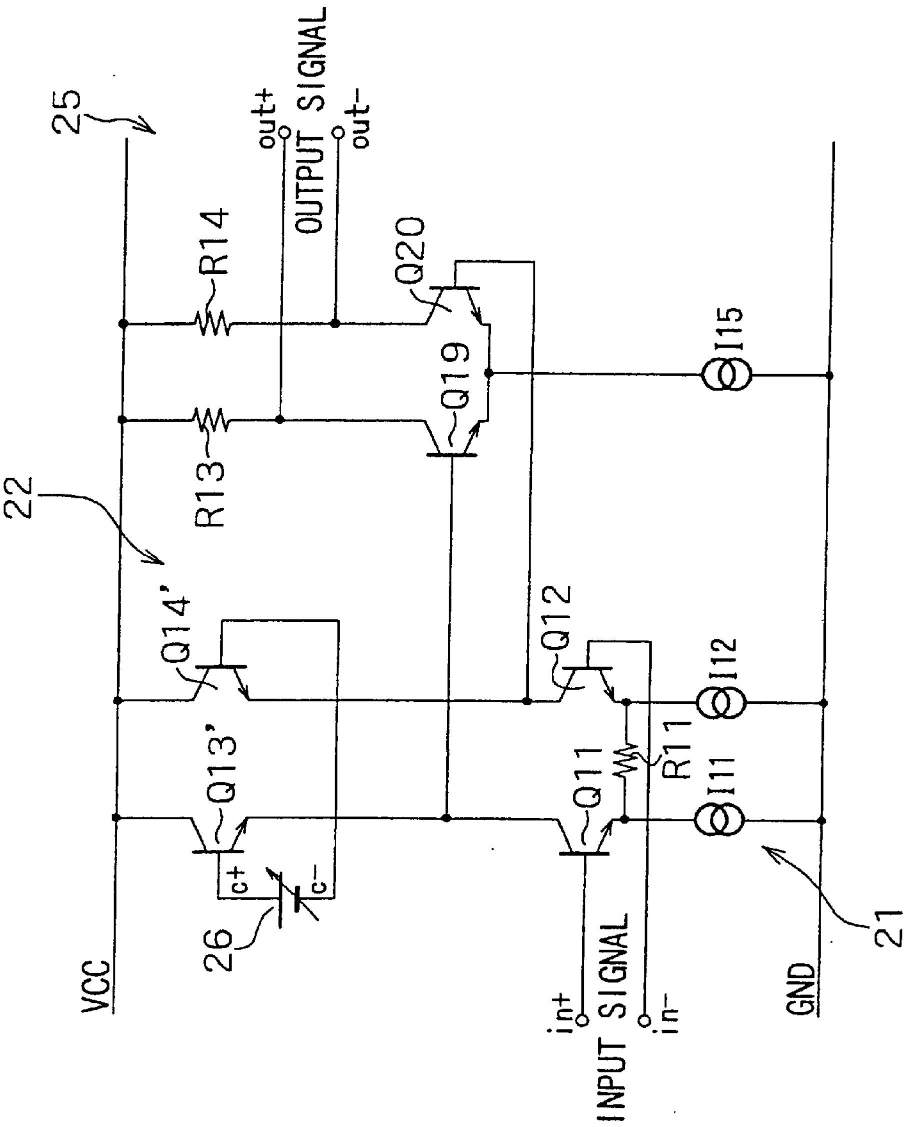
FIG. 4 is a circuit diagram showing an example of an offset provision circuit different from that of the nonlinearity compensation circuit shown in FIG. 2.

For example, as shown in FIG. 4, a variable dc voltage source 26 connected between the bases of transistors Q13' and Q14' is used as the offset provision means such that positive and negative dc voltages thereof are applied as the control voltages c+ and c− to the bases of the transistors Q13' and Q14'. Also with the circuit configuration just described, an offset corresponding to the control voltages c+ and c− can be applied to the differential voltages which increase in proportion to the inverse hyperbolic function.

As described above, in a high-density recording and/or playback apparatus which adopts a PRML signal processing system such as a digital magnetic recording and/or playback apparatus or a digital optical disk apparatus, if the nonlinearity compensation circuit according to the first embodiment having the configuration described above is used to compensate for the nonlinearity of a read signal from the recording medium 1, then, for example, where the head section 2 is an MR head, the playback nonlinearity of the MR head can be compensated for by means of a circuit. As a result, high-density recording of the recording medium 1 can be realized.

Figure 5:
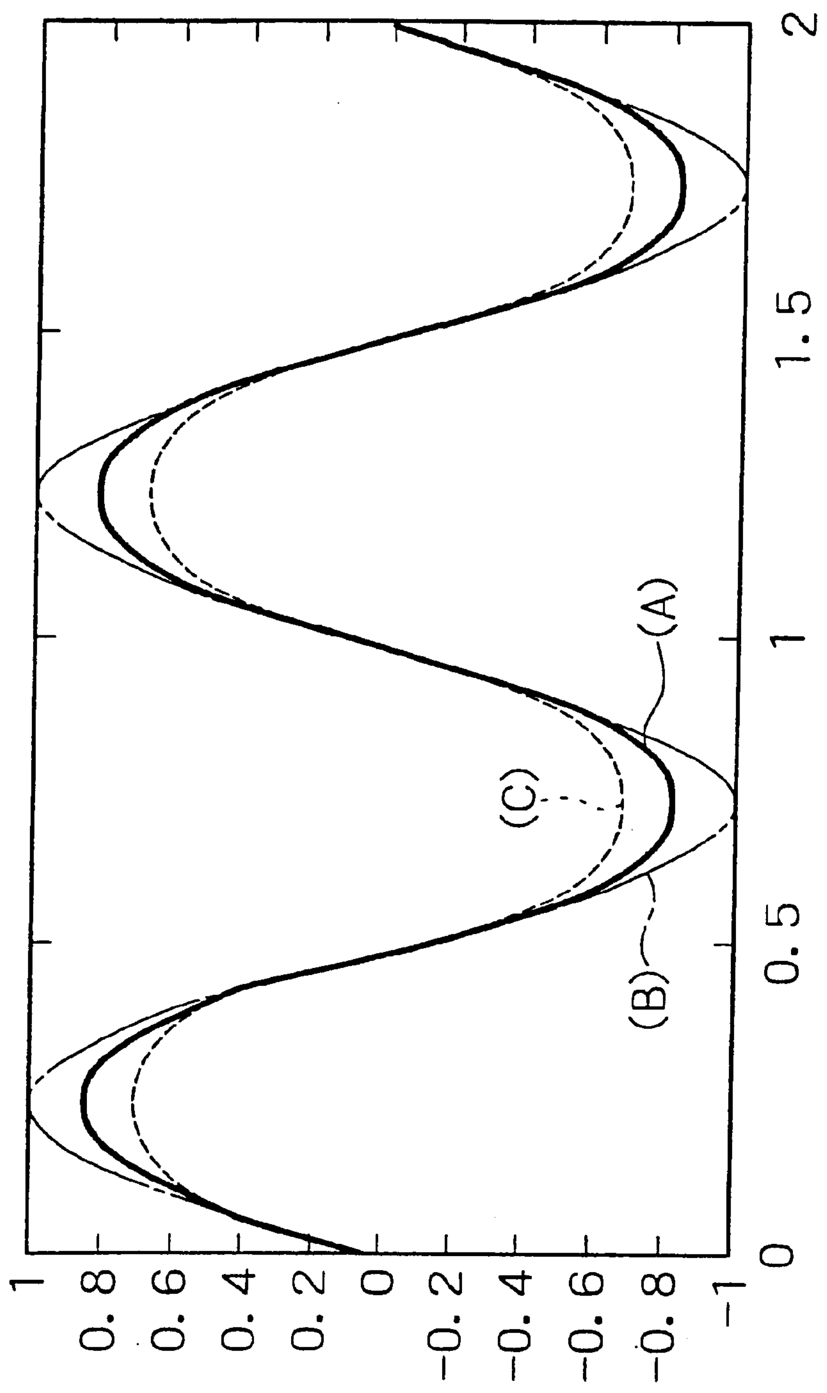
FIG. 5 is a waveform diagram illustrating different examples of residual distortion.

Particularly, since the nonlinearity compensation circuit according to the first embodiment adopts a circuit configuration which does not use a multiplier, it is very simple in circuit configuration when compared with the conventional nonlinearity compensation circuit described hereinabove which employs a squaring circuit. Besides, as can be seen from a characteristic diagram of FIG. 5, where the nonlinearity compensation circuit according to the present embodiment is used, although the characteristic A thereof does not exhibit a sine wave of the curve B, it suffers less ill effects of third order distortion (remaining distortion) and so forth, which are generated incidentally depending upon the circuit, than the characteristic C where a squaring circuit is used.

It is to be noted, however, that a DC offset appears with the output signals out+ and out− of the nonlinearity compensation circuit of FIG. 2. However, this is not an essential problem, and the DC offset can be eliminated readily by additionally providing a cancellation function to the nonlinearity compensation circuit. Particular examples of the nonlinearity compensation circuit which have the offset cancellation function are shown in FIGS. 6 and 7.

Figure 6:
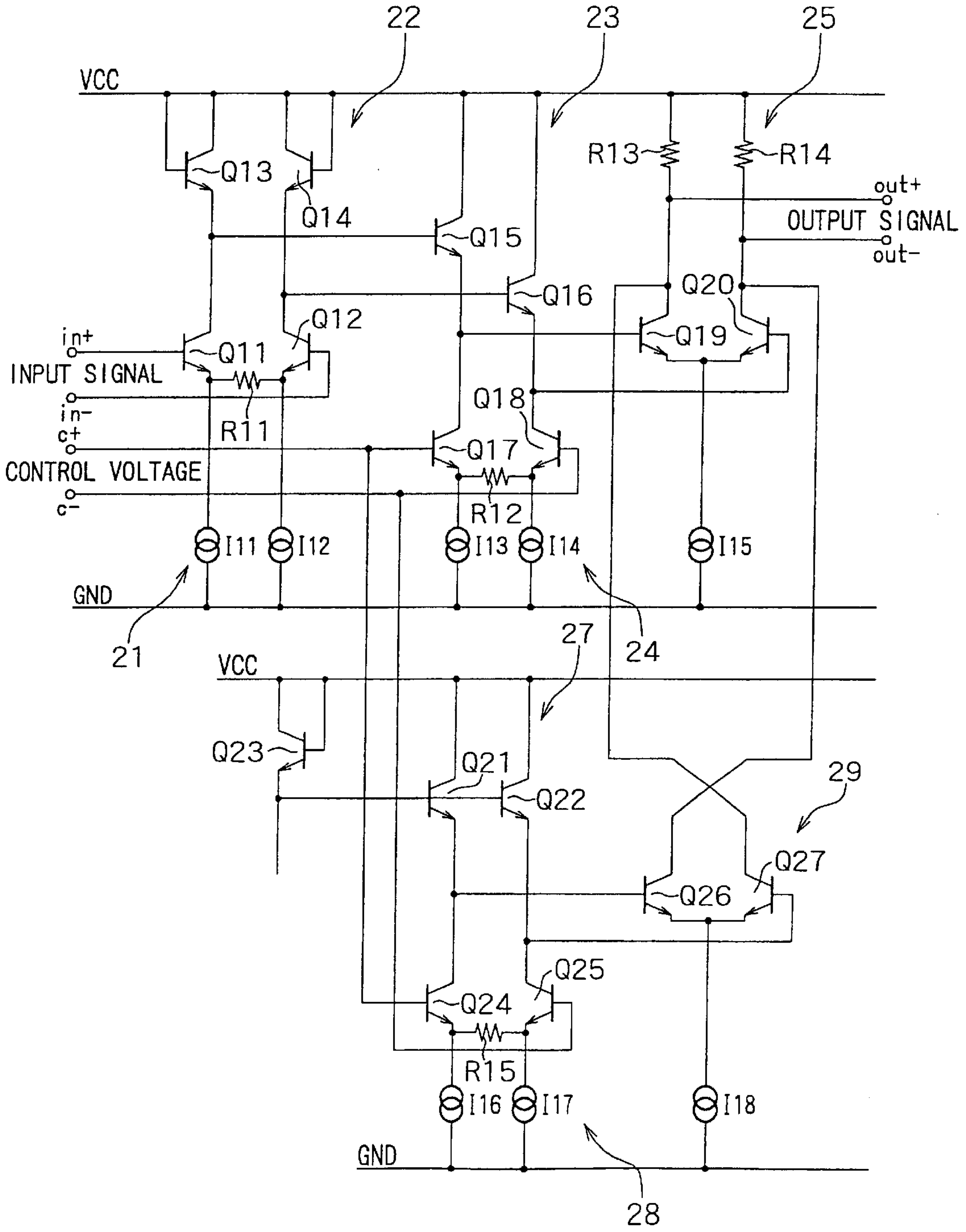
FIG. 6 is a circuit diagram showing a modification to the nonlinearity compensation circuit of FIG. 2 which has an offset cancellation function.
Figure 7:
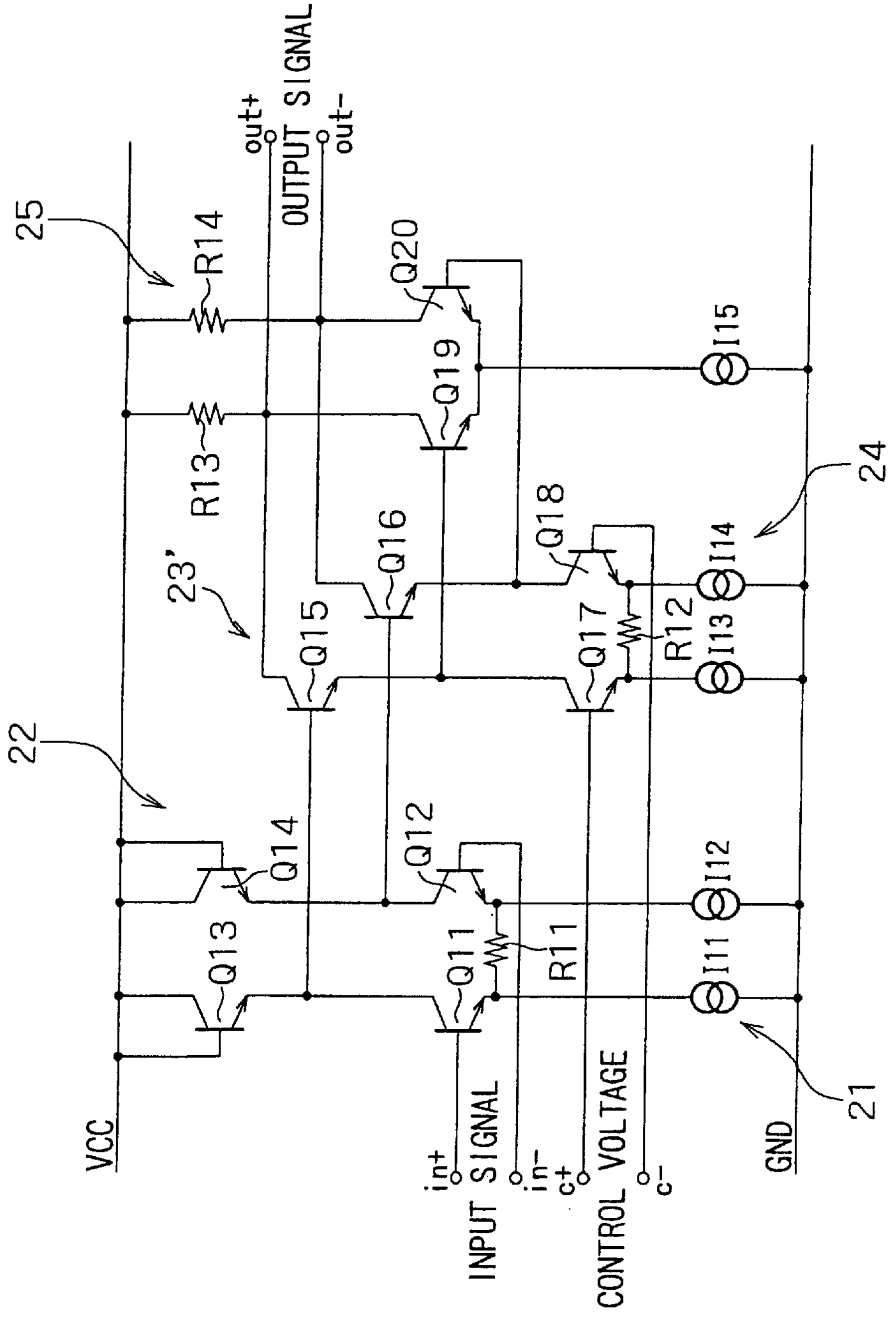
FIG. 7 is a circuit diagram showing another modification to the nonlinearity compensation circuit of FIG. 2 which has an offset cancellation function.

Referring first to FIG. 6, the nonlinearity compensation circuit according to a first form shown includes an offset generation circuit 27, a voltage-current conversion circuit 28 and a differential circuit 29 having basically the same circuit configurations as those of the offset generation circuit 23, voltage-current conversion circuit 24 and hyperbolic function generation circuit 25, respectively.

The offset generation circuit 27 includes a pair of transistors Q21 and Q22 of an emitter follower, and a bias voltage from a transistor Q23 connected in diode connection is applied to the bases of the transistors Q21 and Q22. The offset generation circuit 27 thus generates an offset of the same value as that by the offset generation circuit 23 in response to control voltages c+ and c− applied to the voltage-current conversion circuit 28.

The voltage-current conversion circuit 28 includes differential pair transistors Q24 and Q25 whose collectors are connected to the emitters of the transistors Q21 and Q22 of the emitter follower, respectively, a resistor R15 connected between the emitters of the differential pair transistors Q24 and Q25, and current sources I16 and I17 connected between the emitters of the differential pair transistors Q24 and Q25 and the ground, respectively. The control voltages c+ and c− are applied to the bases of the differential pair transistors Q24 and Q25, respectively.

The differential circuit 29 includes differential pair transistors Q26 and Q27 whose bases are connected to the emitters of the transistors Q21 and Q22, respectively, and whose emitters are connected to commonly, and a current source I18 connected between the emitter common connection point of the transistors Q26 and Q27 and the ground. The collector of the transistor Q26 is connected to the collector of the transistor Q20, and the collector of the transistor Q27 is connected to the collector of the transistor Q19.

In the nonlinearity compensation circuit according to the first form having the configuration described above, the offset generation circuit 27 generates an offset of the same value as that by the offset generation circuit 23, and the differential output terminals of the hyperbolic function generation circuit 25 and the differential circuit 29 are cross-connected. Consequently, the currents flowing through the resistors R13 and R14 cancel each other in accordance with the offsets. Therefore, DC offsets which appear with the output signals out+ and out− can be cancelled readily.

Referring now to FIG. 7, the nonlinearity compensation circuit according to a second form has basically the same circuit configuration as that shown in FIG. 2 but is different only in the configuration of an offset provision circuit 23'. The offset provision circuit 23' includes transistors Q15 and Q16 of an emitter follower. The collectors of the transistors Q15 and Q16 are connected to the collectors of the differential pair transistors Q19 and Q20 of the hyperbolic function generation circuit 25, respectively.

In the nonlinearity compensation circuit according to the second form having the configuration described above, currents flowing through the transistors Q15 and Q16 of the offset provision circuit 23' in accordance with offsets are utilized as they are, and the currents flowing through the resistors R13 and R14 are cancelled by the currents. Consequently, DC offsets which appear with output signals out+ and out− can be cancelled readily.

Now, the control circuit 5 for the nonlinearity compensation circuit 4 shown in FIG. 1 is described. The nonlinearity compensation circuit 4 may use not only such a nonlinearity compensation circuit according to the present invention described above but also other nonlinearity compensation circuits such as a squaring circuit and a polygonal line approximation circuit. The control circuit 5 detects a distortion amount of an input waveform (playback waveform) to the nonlinearity compensation circuit 4 and varies the control voltages c+ and c− to be provided to the nonlinearity compensation circuit 4 in accordance with the distortion amount to automatically adjust the nonlinearity compensation amount (correction amount).

In order to perform this automatic control, the reference level for an input waveform must be determined distinctly. Where a distortion-free waveform such as, for example, a sine wave of sin(ωt) is considered, when the DC level is zero, the absolute values (amplitude) of the positive side peak value and the negative side peak value are equal to each other and the times (duties) within which the waveform exhibits a positive side value and a negative side value are equal to each other. However, a distorted waveform does not satisfy the relationships just described even where a CD component is removed merely using a capacitive coupling, and accurate distortion information cannot be obtained from the distorted waveform.

Therefore, in the control circuit according to the present invention, a level for cutting an input waveform with which each of the duties on the positive side and negative side waveform portions is 50% is set as a reference level, and the difference between absolute values of a positive side peak value and a negative side peak value with respect to the set level is used as information of second order distortion. In the following, different forms of the control circuit are described.

Figure 8:
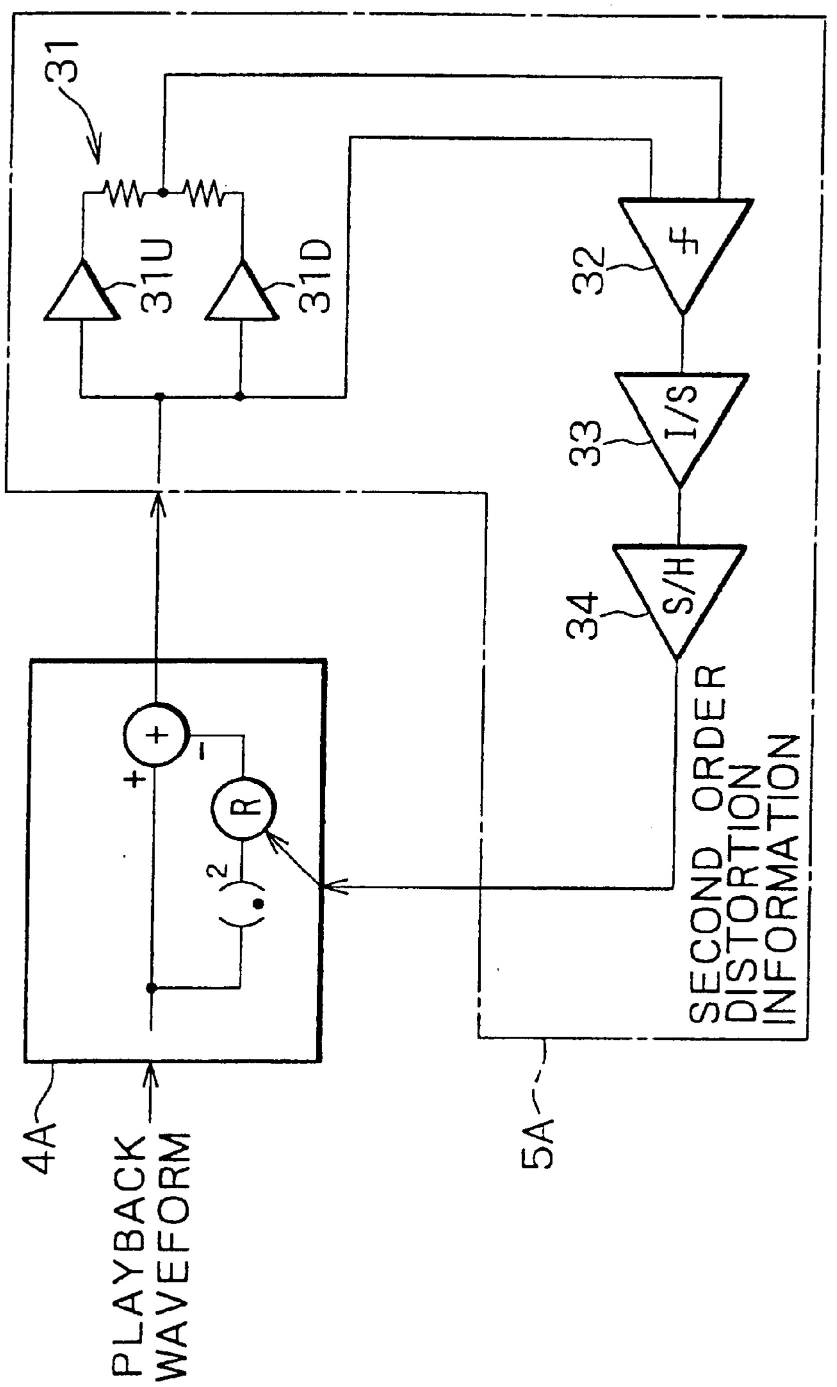
FIGS. 8 to 11 are circuit diagrams showing circuit configurations of a control circuit for a nonlinearity compensation circuit to which the present invention is applied.

FIG. 8 shows a circuit configuration of a control circuit to which the present invention is applied. Referring to FIG. 8, the control circuit shown is generally denoted at SA and controls a nonlinearity compensation circuit 4A which includes a squaring circuit.

The control circuit 5A includes a center value setting circuit 31, a comparator 32, an integrator 33 and a sample hold (S/H) circuit 34. The center value setting circuit 31 includes a pair of peak detectors 31U and 31D for detecting upper side and lower side peak values of a playback waveform inputted, for example, from the nonlinearity compensation circuit 4A and sets a center value between the upper and lower peaks.

The comparator 32 receives the center value set by the center value setting circuit 31 as a reference level and compares the playback waveform with the reference level to divide the playback waveform into a positive side waveform portion and a negative side waveform portion with regard to time. The integrator 33 averages the difference between the positive side and negative side waveform portions obtained by the division with regard to time by the comparator 32. The sample hold circuit 34 samples the average value obtained by the integrator 33 and provides the sampled average value as information of second order distortion to the nonlinearity compensation circuit 4A.

In the control circuit 5A having the configuration described above, waveform comparison is performed by the comparator 32 with respect to the center value between the upper and lower peaks set by the center value setting circuit 31, and a result of the comparison is fed back so that it may be just equal to the duty of 50%. Consequently, the control circuit 5A can grasp the distortion amount of the playback waveform with a maximum sensitivity and control the nonlinearity compensation circuit 4A so that the distortion may be compensated for.

It is to be noted that, while the control circuit 5A is configured so as to perform waveform comparison with respect to a center value between upper and lower peaks, since, when second order distortion is cancelled (compensated for), the peak-to-peak center of the waveform and the average level of the waveform coincide with each other and, when the waveform is sliced with the average level, both of the positive side duty and the negative side duty are 50% and equal to each other, where control of the feedback type is used, it is otherwise possible to adopt a configuration wherein an AC coupled (capacity coupled) playback waveform is sliced at the zero level.

Figure 9:
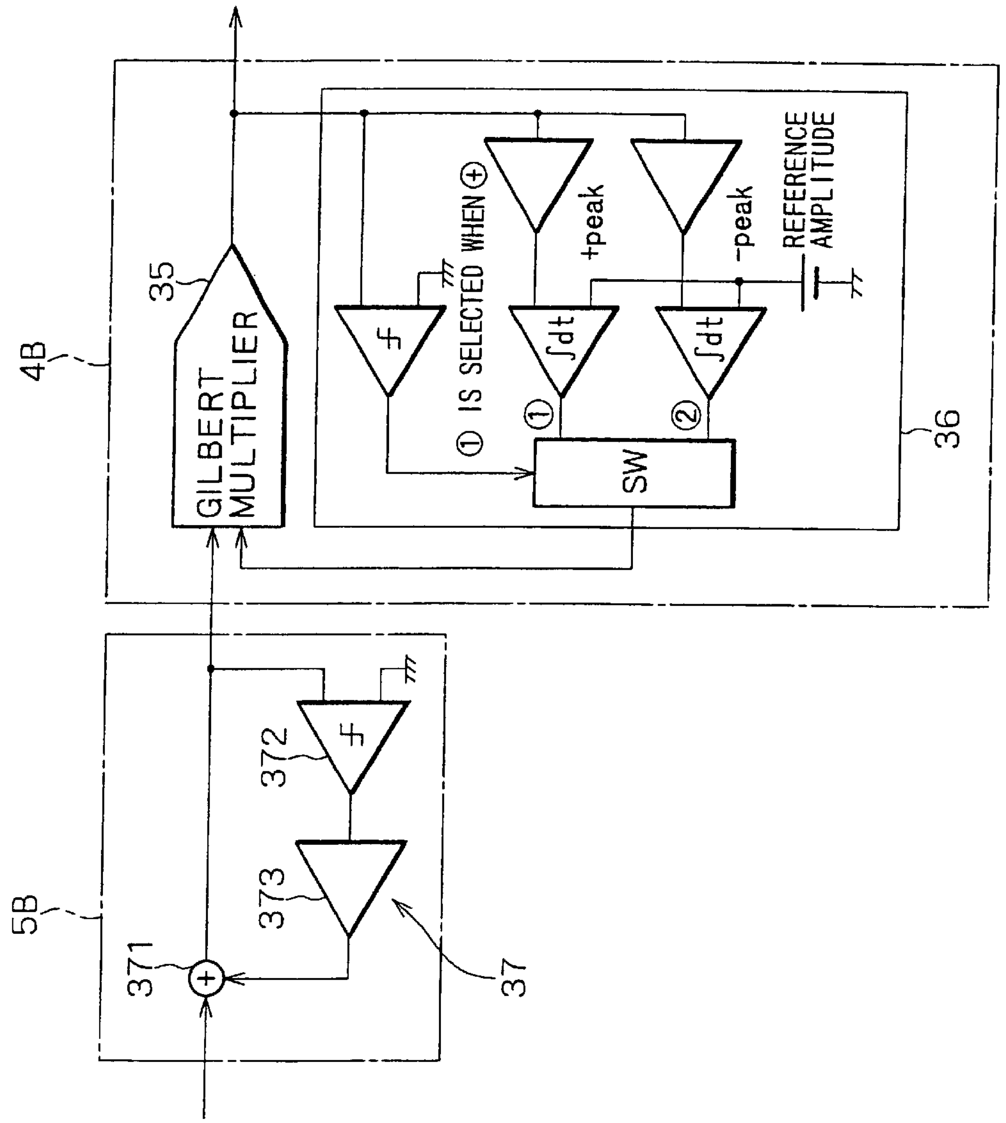

FIG. 9 shows a circuit configuration of another control circuit to which the present invention is applied. Referring to FIG. 9, the control circuit is generally denoted at 5B and controls a nonlinearity compensation circuit 4B which uses a polygonal approximation circuit In particular, the nonlinearity compensation circuit 4B includes a Gilbert multiplier 35 and a peak detector 36.

The control circuit 5B includes a bias level adjustment circuit 37 for adjusting the bias level for a distorted waveform (playback waveform) so that the upper and lower duties of the waveform may each be equal to 50%. The bias level adjustment circuit 37 includes an adder 371, a comparator 372, and an integrator 373. The adder 371 adds a bias level to the distorted waveform, and an addition output of the adder 371 is compared with, for example, the ground level by the comparator 372. A result of the comparison is integrated by the integrator 373, and a result of the integration is inputted (fed back) as the bias level to the adder 371 so that the upper and lower duties may each be 50% in average.

The playback waveform whose bias level has been adjusted by the bias level adjustment circuit 37 is supplied to the Gilbert multiplier 35. An output of the Gilbert multiplier 35 is supplied to the peak detector 36. The peak detector 36 detects peak values of the positive side and negative side portions of the playback waveform, amplifies (or integrates) the differences between the positive side and negative side peak values with respective predetermined target values (reference amplitudes), and negatively feeds back a result of the amplification to the Gilbert multiplier 35. The Gilbert multiplier 35 thereby adjusts the positive side and negative side peak values with respect to the bias level, that is, the upper and lower amplitudes so that they may be equal to each other.

In the control circuit 5B having the configuration described above, the bias level of the playback waveform is adjusted by the bias level adjustment circuit 37 so that the upper and lower duties may each be 50% and the positive side and negative side amplitudes are controlled so that they may be equal to each other with respect to the bias level. Therefore, the control circuit 5B can grasp the distortion amount of the playback waveform with a maximum sensitivity and can control the nonlinearity compensation circuit 4B so as to perform compensation for the distortion.

Figure 10:
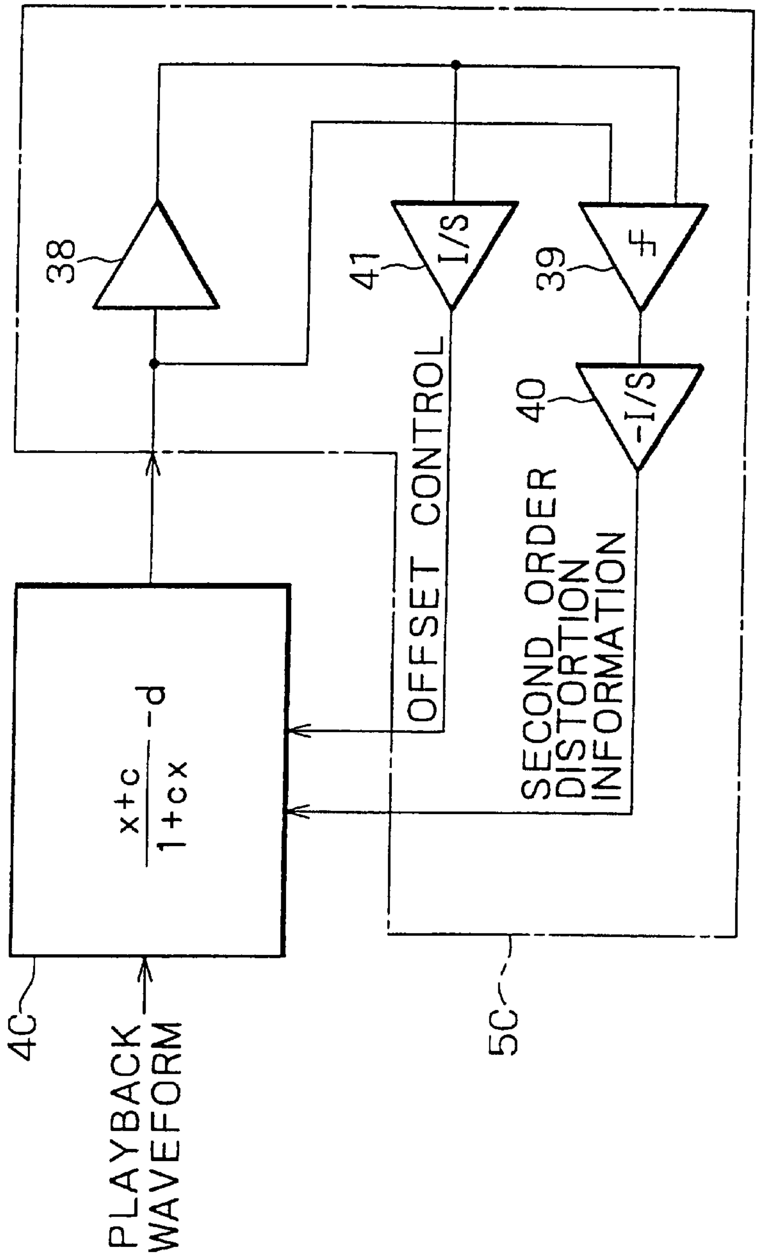

FIG. 10 shows a circuit configuration of a further control circuit to which the present invention is applied. Referring to FIG. 10, the control circuit is generally denoted at 5C and controls a nonlinearity compensation circuit 4C which is formed in accordance with the present invention as described hereinabove with reference to FIG. 2.

The control circuit 5C includes an average value circuit 38, a comparator 39, and a pair of integrators 40 and 41. The average value circuit 38 calculates an average value of, for example, a playback waveform outputted from the nonlinearity compensation circuit 4C. The comparator 39 receives the average value calculated by the average value circuit 38 as a reference level and compares the playback waveform with the reference value to divide the waveform into positive side and negative side waveform portions with regard to time.

The integrator 40 averages the difference between the time-divided positive side and negative side waveform portions and supplies the average value as information of second order distortion to the nonlinearity compensation circuit 4C. The integrator 41 integrates the average value calculated by the average value circuit 38 and supplies a result of the integration as offset control information to the nonlinearity compensation circuit 4C.

In the control circuit 5C having the configuration described above, the playback waveform is compared with the average value calculated by the average value circuit 38 by the comparator 39, and a result of the comparison is negatively fed back so that the positive side and negative side waveform portions may each have a duty of 50%. Consequently, the control circuit 5C can grasp the distortion amount of the playback waveform with a maximum sensitivity and can control the nonlinearity compensation circuit 4C so as to compensate for the distortion.

Figure 11:
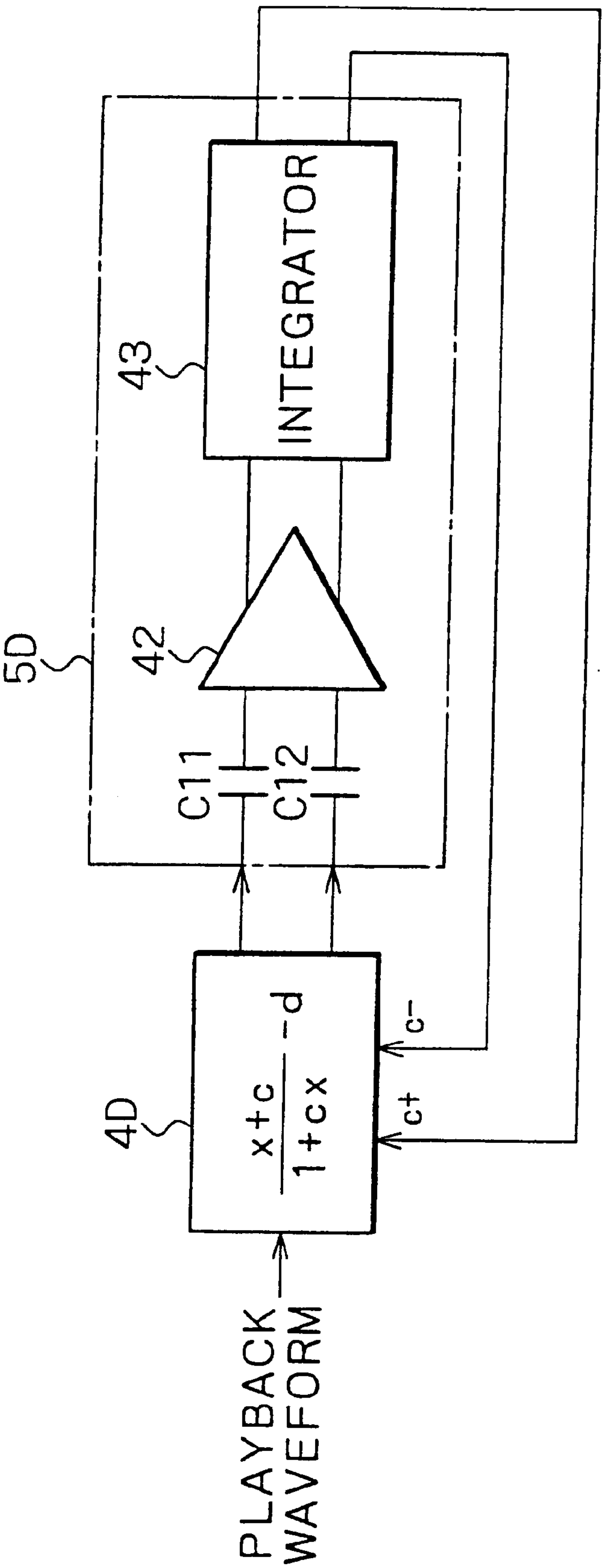

FIG. 11 shows a circuit configuration of a still further control circuit to which the present invention is applied. Referring to FIG. 11, the control circuit is generally denoted at 5D and controls a nonlinearity compensation circuit 4D which is formed in accordance with the present invention similarly as described hereinabove with reference to FIG. 2.

The control circuit 5D includes a pair of capacitors C11 and C12, a comparator 42, and an integrator 43. The comparator 42 is AC coupled to the outputs of the nonlinearity compensation circuit 4D by means of the capacitors C11 and C12 thereby to omit a circuit portion for calculating a center value between upper and lower peak values of a playback waveform or an average value of a playback waveform. In this instance, the comparator 42 slices the AC coupled playback waveform at the zero level to divide the playback waveform into positive side and negative side waveform portions with regard to time.

The integrator 43 averages the difference between the positive side and negative side waveform portions time-divided by the comparator 42 and supplies the average value as information of second order distortion (control voltages c+ and c−) to the nonlinearity compensation circuit 4D. The integrator 43 may have, for example, a charge pump circuit configuration. An example of the integrator 43 of the charge pump circuit configuration is shown in FIG. 12.

Figure 12:
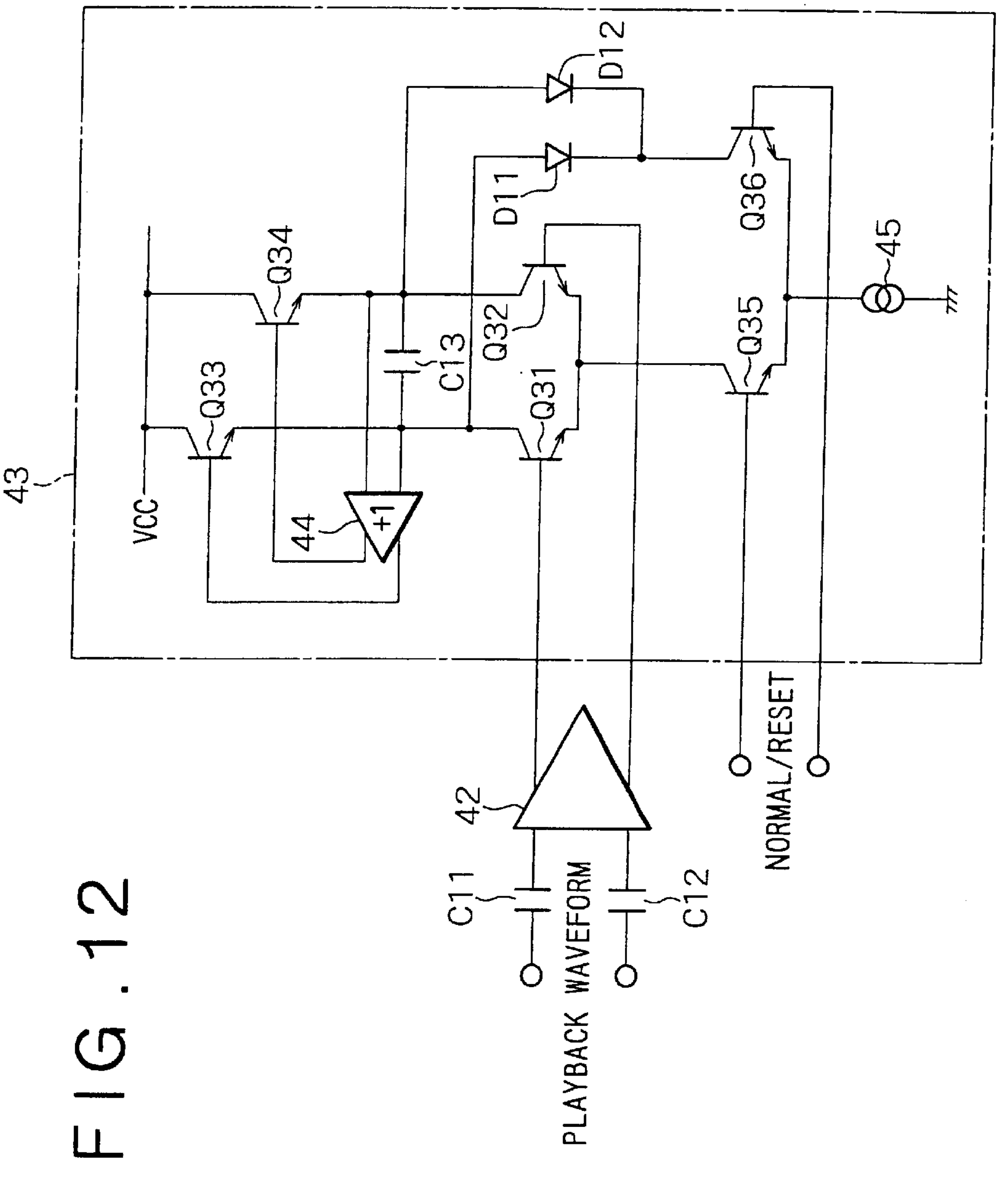
FIG. 12 is a circuit diagram showing an example of a circuit of an integrator of the charge pump type which can be used in the control circuit of FIG. 11.

Referring to FIG. 12, a result of the comparator 42 is supplied between the bases of differential pair transistors Q31 and Q32 whose emitters are connected commonly. The collectors of the differential pair transistors Q31 and Q32 are connected to the power supply VCC through transistors Q33 and Q34, respectively, and a charge pump capacitor C13 is connected between the collectors of the differential pair transistors Q31 and Q32. The collector potentials of the differential pair transistors Q31 and Q32 are applied to the bases of the transistors Q33 and Q34, respectively, through a buffer 44.

In order to control a normal operation/resetting operation of the integrator 43, it includes differential pair transistors Q35 and Q36 whose emitters are connected commonly. The emitter common connection point of the transistors Q35 and Q36 is grounded through a current source 45, and a control signal for controlling the normal operation/resetting operation of the integrator 43 is supplied between the bases of the transistors Q35 and Q36.

The emitter common connection point of the differential pair transistors Q31 and Q32 is connected to the collector of the transistor Q35. The cathodes of diodes D11 and D12 are connected to the collector of the transistor Q36. The anodes of the diodes D11 and D12 are connected to the collectors of the differential pair transistors Q31 and Q32, respectively.

Now, the nonlinearity compensation circuit 4D which is an object of control of the control circuit 5D is described. While the nonlinearity compensation circuit according to the present invention described hereinabove can be used for the nonlinearity compensation circuit 4D, it is assumed that a nonlinearity compensation circuit of a modified configuration is used here. It is to be noted that the nonlinearity compensation circuit here has a basic configuration similar to that of the nonlinearity compensation circuit according to the present invention described hereinabove, particularly the nonlinearity compensation circuit described hereinabove with reference to FIG. 2.

However, as described hereinabove, the nonlinearity compensation circuit according to the present invention has an input-output characteristic represented by a form of a function of $$y=(x+c)/(1+cx)$$

and therefore symmetrical with regard to the input signal x and the control signal c, and the input signal x and the control signal c can replace each other. Therefore, it is assumed that the nonlinearity compensation circuit described here is so configured that it generates an inverse hyperbolic function in accordance with the control voltages c+ and c− and provides an offset in accordance with the input signals in+ and in−.

Figure 13:
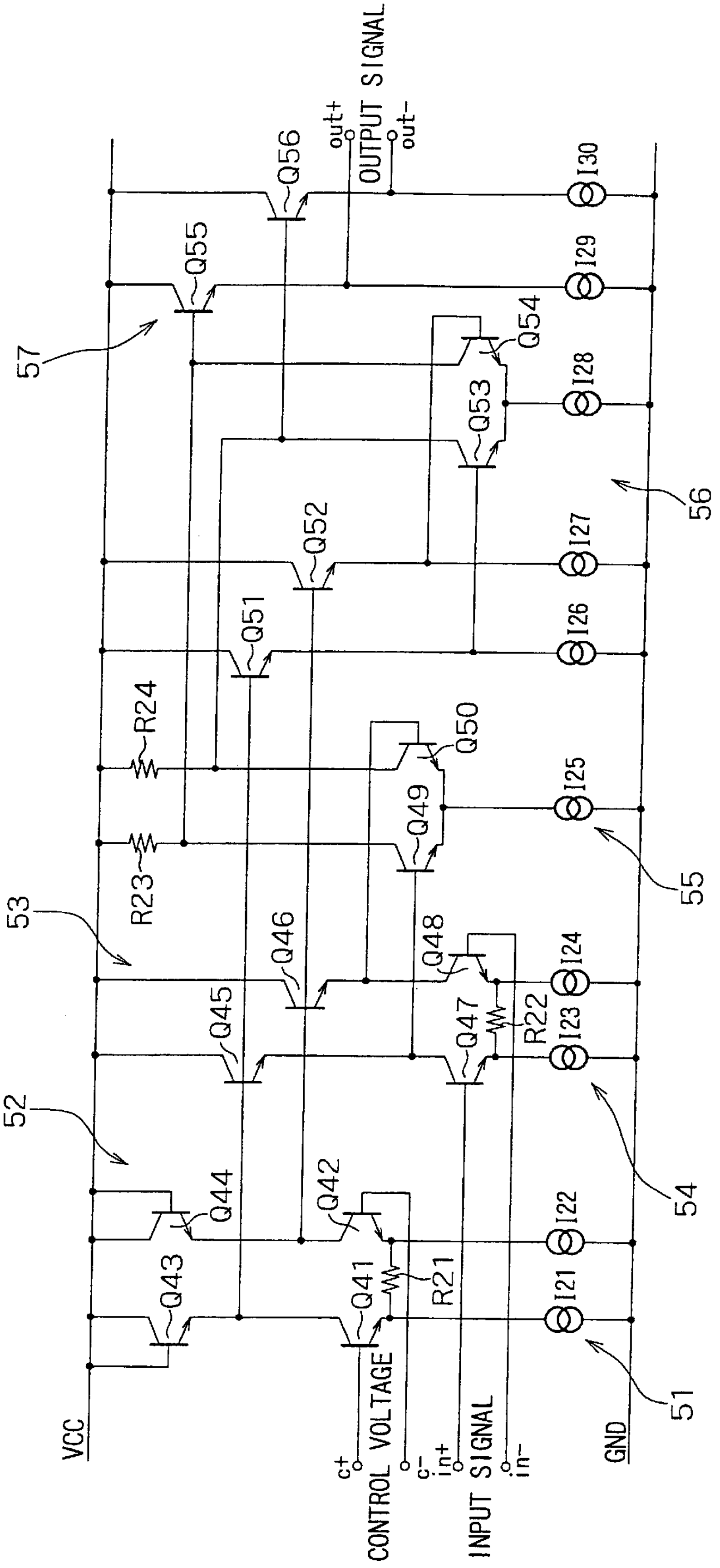
FIG. 13 is a circuit diagram showing another example of a circuit of a nonlinearity compensation circuit which can be controlled by the control circuit of FIG. 11.

FIG. 13 shows the nonlinearity compensation circuit just described. It is to be noted that the present nonlinearity compensation circuit additionally has an offset cancellation function.

Referring to FIG. 13, the nonlinearity compensation circuit shown includes a voltage-current conversion circuit 51, an inverse hyperbolic function generation circuit 52, an offset provision circuit 53, another voltage-current conversion circuit 54, a hyperbolic function generation circuit 55, an offset cancellation circuit 56, and an outputting circuit 57.

The voltage-current conversion circuit 51 includes differential pair transistors Q41 and Q42, a resistor R21 connected between the emitters of the differential pair transistors Q41 and Q42, and current sources I21 and I22 connected between the emitters of the differential pair transistors Q41 and Q42 and the ground. The voltage-current conversion circuit 51 thus converts control voltages c+ and c− applied to the bases of the differential pair transistors Q41 and Q42 into a pair of differential currents.

The inverse hyperbolic function generation circuit 52 includes transistors Q43 and Q44 connected in diode connection between the collectors of the differential pair transistors Q41 and Q42 and the power supply VCC, respectively. The inverse hyperbolic function generation circuit 52 converts the pair of differential currents obtained by the voltage-current conversion circuit 51 into the differential voltages which increase in proportion to an inverse hyperbolic function by diode compression.

The offset provision circuit 53 includes transistors Q45 and Q46 of an emitter follower wherein the bases are connected to the collectors of the differential pair transistors Q41 and Q42, respectively, and the collectors are connected to the power supply VCC. The offset provision circuit 53 thus provides an offset to the difference voltage obtained by conversion by the inverse hyperbolic function generation circuit 52 in response to the input signals in+ and in− provided to the voltage-current conversion circuit 54.

The voltage-current conversion circuit 54 includes differential pair transistors Q47 and Q48 whose collectors are connected to the emitters of the transistors Q45 and Q46 of the emitter follower, a resistor R22 connected between the emitters of the transistors Q47 and Q48, and current sources I23 and I24 connected between the emitters of the differential pair transistors Q47 and Q48 and the ground, respectively. The voltage-current conversion circuit 54 thus converts the input signals in+ and in− applied to the bases of the differential pair transistors Q47 and Q48 into differential currents.

The hyperbolic function generation circuit 55 includes differential pair transistors Q49 and Q50 whose bases are connected to the emitters of the transistors Q45 and Q46, respectively, and whose emitters are connected commonly, resistors R23 and R24 connected between the collectors of the differential pair transistors Q49 and Q50 and the power supply VCC, respectively, and a current source I25 connected between the emitter common connection point of the differential pair transistors Q49 and Q50 and the ground. The hyperbolic function generation circuit 55 thus converts the differential voltages to which an offset has been added by the offset provision circuit 53 into differential voltages which increase in proportion to a hyperbolic function.

The offset cancellation circuit 56 includes transistors Q51 and Q52 whose bases are connected to the collectors of the differential pair transistors Q41 and Q42, respectively, and whose collectors are connected to the power supply VCC, current sources I26 and I27 connected between the emitters of the transistors Q51 and Q52 and the ground, respectively, differential pair transistors Q53 and Q54 whose bases are connected to the emitters of the transistors Q51 and Q52, respectively, and whose collectors are connected to the collectors of the differential pair transistors Q49 and Q50, respectively, and a current source I28 connected between the emitter common connection point of the differential pair transistors Q53 and Q54 and the ground.

Figure 14:
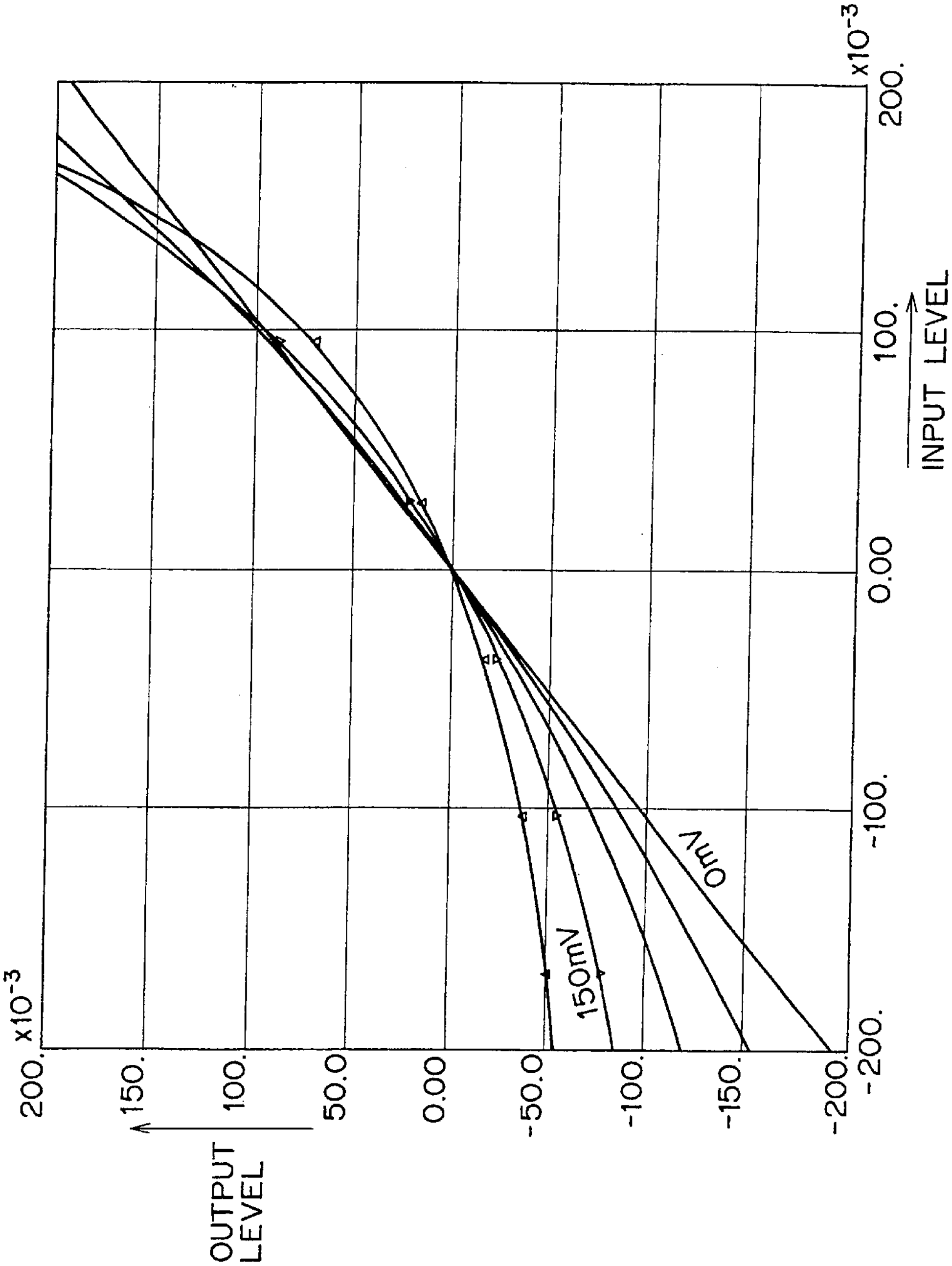
FIG. 14 is a diagram of an input/output characteristic illustrating a cancellation effect of an offset cancellation circuit of the nonlinearity compensation circuit of FIG. 13.

The offset cancellation circuit 56 having the configuration described above operates in accordance with the basically same operation principle as that of the circuit described hereinabove with reference to FIG. 6, and the collectors of the differential pair transistors Q49 and Q50 and the collectors of the differential pair transistors Q53 and Q54 are connected in cross connection. Therefore, currents flowing through the resistors R23 and R24 cancel each other in accordance with an offset, and consequently, the DC offset can be cancelled. A cancellation effect of the DC offset by the offset cancellation circuit 56 is illustrated in FIG. 14.

The outputting circuit 57 includes transistors Q55 and Q56 of an emitter follower whose bases are connected to the collectors of the differential pair transistors Q49 and Q50, respectively, and whose collectors are connected to the power supply VCC, and current sources I29 and I30 connected between the emitters of the transistors Q55 and Q56 and the ground, respectively. The outputting circuit 57 thus outputs output signals out+ and out− from which the DC offset has been cancelled, from the emitters of the transistors Q55 and Q56, respectively.

Figure 15:
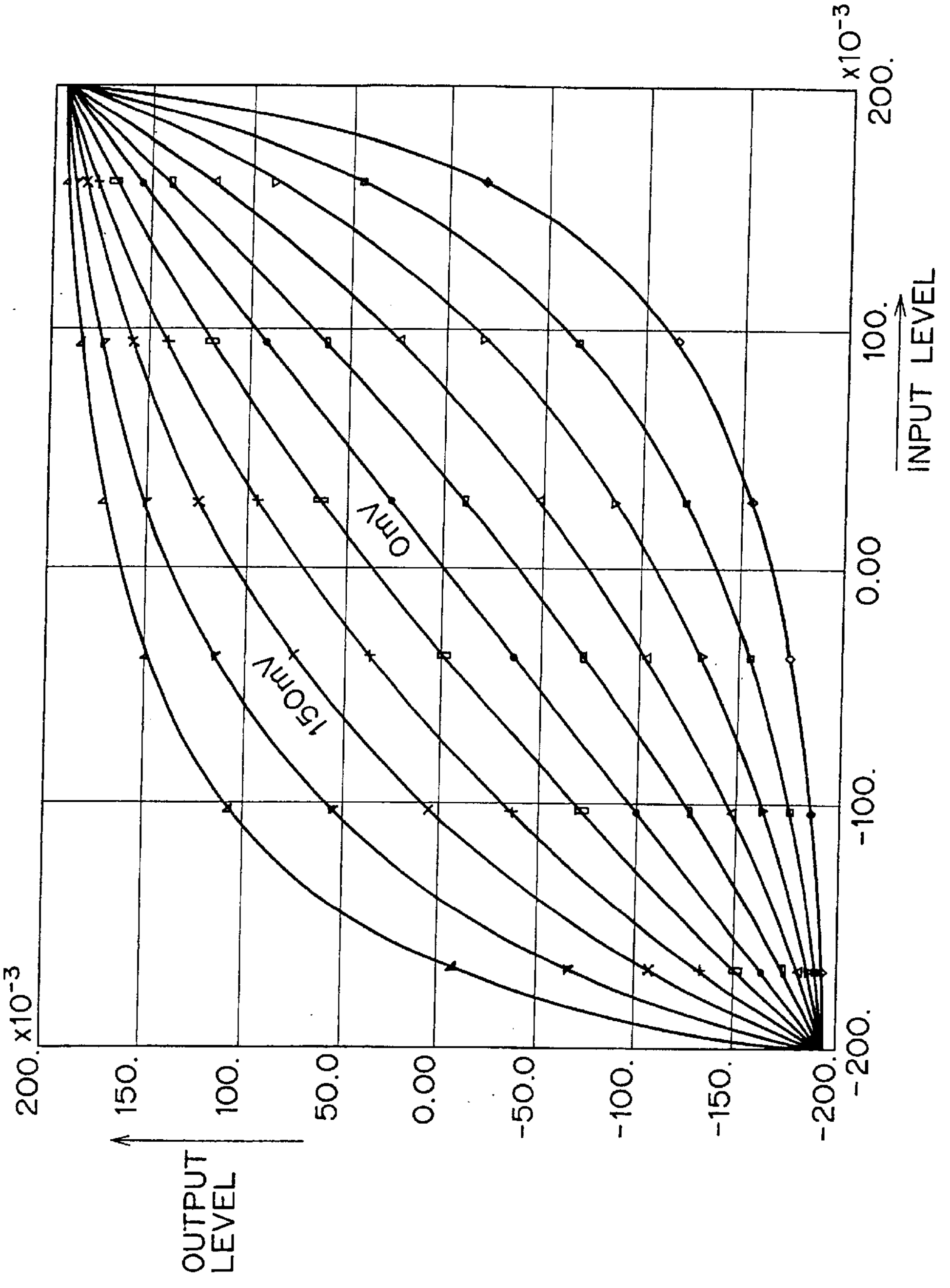
FIG. 15 is a diagram of an input-output characteristic of the nonlinearity compensation circuit of FIG. 13.

In the nonlinearity compensation circuit of the configuration described above, the voltage-current conversion circuit 54 on the input signal (in+, in−) side exhibits high linearity through feedback by an amplifier of a high gain. Further, in the nonlinearity compensation circuit, each of the upper and lower side duties of the playback waveform exhibits 50% simultaneously when the output signal exhibits an optimum value with which it includes no second order distortion. An input-output characteristic of the nonlinearity compensation circuit of the circuit configuration of FIG. 13 is illustrated in FIG. 15.

It is to be noted that, also in the nonlinearity compensation circuit of the circuit configuration, where the input signals in+ and in− or the control voltages c+ and c− are originally given as differential currents, the voltage-current conversion circuits 51 and 54 can be omitted.

In the control circuit 5D described hereinabove with reference to FIG. 11, an AC coupled playback waveform is sliced at the zero level (reference level) by the comparator 42 and a result of the slice comparison is fed back so that each of the upper side and lower side waveform portions of the result of the slice comparison may have the duty of 50%. Consequently, the control circuit 5D can grasp the distortion amount of the playback waveform with a maximum sensitivity and can control the nonlinearity compensation circuit 4D so as to compensate for the distortion.

As described above, where a recording and/or playback apparatus which includes a nonlinearity compensation circuit for compensating for the nonlinearity such as second order distortion of a playback waveform read from a recording medium such as a magnetic disk, a magnetic tape or an optical disk uses, as a control circuit for the nonlinearity compensation circuit, any of the control circuits 5A to 5D described hereinabove to control the compensation amount for the nonlinearity, a system can be constructed in a self-complete fashion. Besides, since a loop can be formed compact, the recording and/or playback apparatus is superior also in terms of the stability and can perform compensation on the real-time basis when it is actually used.

It is to be noted that, while the control circuits 5A, 5C and 5D described hereinabove have a configuration for feedback control wherein second order distortion information is determined based on a playback waveform received through the nonlinearity compensation circuit 4A, 4C or 4D and supplied to the nonlinearity compensation circuit 4A, 4C or 4D, alternatively they may take another configuration for feedforward control wherein information of second order distortion is determined based on an input waveform to the nonlinearity compensation circuit 4A, 4C or 4D and supplied to the nonlinearity compensation circuit 4A, 4C or 4D as indicated by a broken line in FIG. 1.

Additionally, as can be seen from the input-output characteristic diagram of FIG. 15, since correction of the nonlinearity is applied to a linear input-output characteristic when the correction amount (compensation amount) is zero, irrespective of whether the correction amount is in the positive or the in the negative, the output level becomes lower than the input level. The nonlinearity compensation (asymmetric correction) is performed irrespective of whether the output gain is high or low, and finally, the output gain can be managed by AGC (automatic gain control) or the like.

Actually, however, since a circuit which is liable to have an influence on the S/N or the C/N such as the equalizer 6 (or a filter) is connected in the next stage to the nonlinearity compensation circuit as seen in FIG. 1, also the gain management of the nonlinearity compensation circuit is significant. Even if automatic gain control is applied, for example, with a final output, the input level to the equalizer 6 (or a filter) does not rise, but the S/N or the C/N is deteriorated. Further, if an automatic gain control circuit is placed in the output stage of the nonlinearity compensation circuit, then the circuit scale increases as much, and besides, the nonlinearity compensation circuit and the automatic control gain circuit are complicated with double loops.

Figure 16:
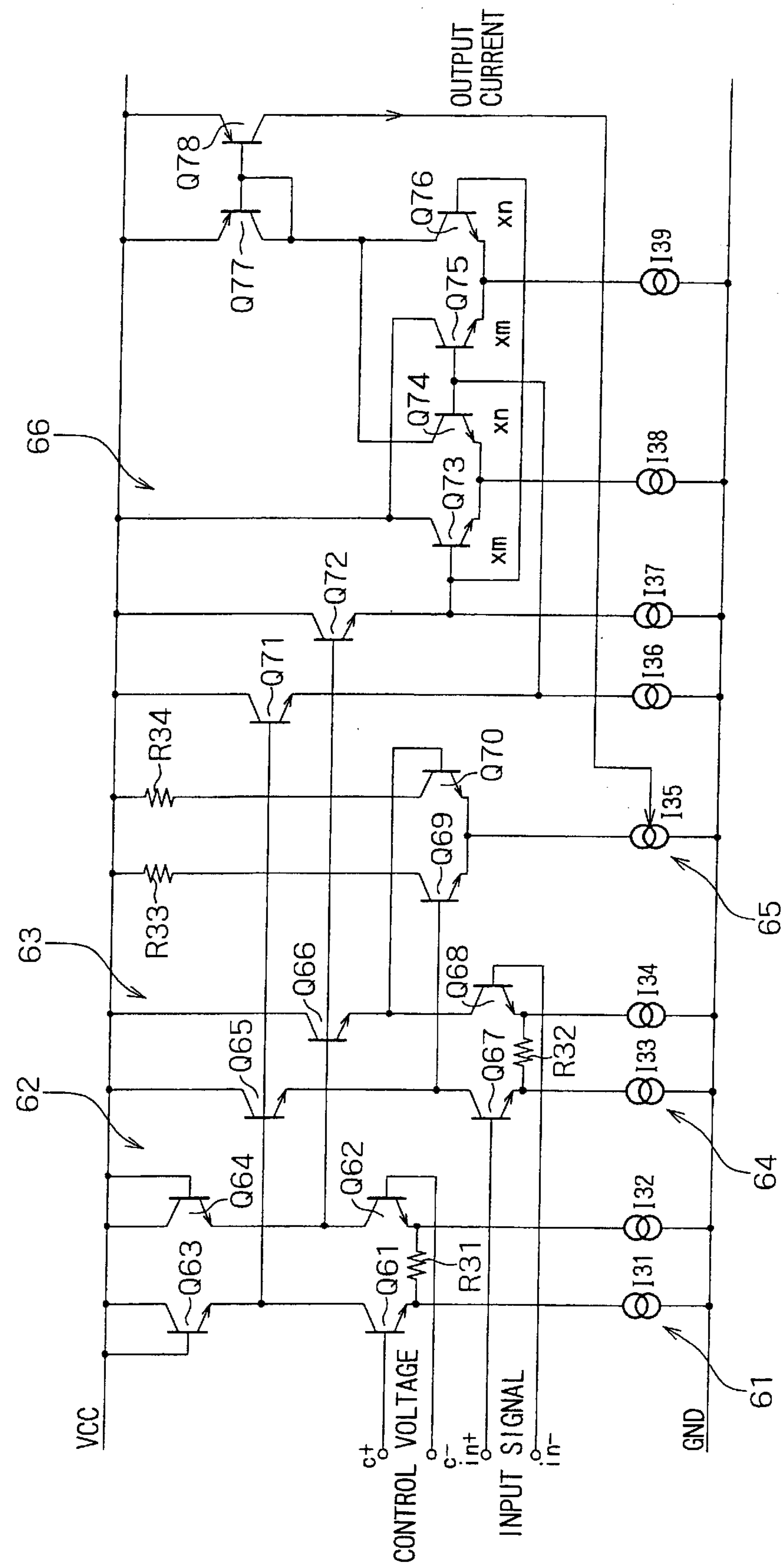
FIG. 16 is a circuit diagram showing a circuit configuration of another nonlinearity compensation circuit to which the present invention is applied.

From the foregoing points of view, the present invention provides, as another nonlinearity compensation circuit to which it is applied, a nonlinearity compensation circuit which can reduce a gain fluctuation with a simple circuit configuration. FIG. 16 shows a circuit configuration of the nonlinearity compensation circuit to which the present invention is applied.

Referring to FIG. 16, the nonlinearity compensation circuit shown includes a voltage-current conversion circuit 61, an inverse hyperbolic function generation circuit 62, an offset provision circuit 63, another voltage-current conversion circuit 64, a hyperbolic function generation circuit 65 and a current control circuit 66. The voltage-current conversion circuit 61, inverse hyperbolic function generation circuit 62, offset provision circuit 63, voltage-current conversion circuit 64 and hyperbolic function generation circuit 65 have basically the same configurations as those of the nonlinearity compensation circuit described hereinabove with reference to FIG. 2.

The voltage-current conversion circuit 61 includes differential pair transistors Q61 and Q62, a resistor R31 connected between the emitters of the differential pair transistors Q61 and Q62, and current sources I31 and I32 connected between the emitters of the differential pair transistors Q61 and Q62 and the ground, respectively. The voltage-current conversion circuit 61 thus converts input signals in+ and in− applied to the bases of the differential pair transistors Q61 and Q62 into a pair of differential currents.

The inverse hyperbolic function generation circuit 62 includes transistors Q63 and Q64 connected between the collectors of the differential pair transistors Q61 and Q62 and the power supply VCC, respectively, and each connected in diode connection. The inverse hyperbolic function generation circuit 62 thus converts a pair of differential currents obtained by the voltage-current conversion circuit 61 into differential voltages which increase in proportion to an inverse hyperbolic function through diode compression.

The offset provision circuit 63 includes transistors Q65 and Q66 of an emitter follower wherein the bases are connected to the collectors of the differential pair transistors Q61 and Q62, respectively, and the collectors are connected to the power supply VCC. The offset provision circuit 63 thus provides an offset to the differential voltages obtained by the conversion by the inverse hyperbolic function generation circuit 62 in accordance with the control voltages c+ and c− supplied to the voltage-current conversion circuit 64.

The voltage-current conversion circuit 64 includes differential pair transistors Q67 and Q68 whose collectors are connected to the emitters of the transistors Q65 and Q66 of the emitter follower, respectively, a resistor R32 connected between the emitters of the differential pair transistors Q67 and Q68, and current sources I33 and I34 connected between the emitters of the differential pair transistors Q67 and Q68 and the ground, respectively. The voltage-current conversion circuit 64 thus converts the control voltages c+ and c− applied to the bases of the differential pair transistors Q67 and Q68 into differential currents, respectively.

The hyperbolic function generation circuit 65 includes differential pair transistors Q69 and Q70 whose bases are connected to the emitters of the transistors Q65 and Q66, respectively, and whose emitters are connected commonly, resistors R33 and R34 connected between the collectors of the differential pair transistors Q69 and Q70 and the power supply VCC, respectively, and a current source I35 connected between the emitter common connection point between the differential pair transistors Q69 and Q70 and the ground. The hyperbolic function generation circuit 65 thus converts the differential voltages, to which the offset has been provided by the offset provision circuit 63, into differential voltages which increase in proportion to a hyperbolic function.

The current control circuit 66 includes transistors Q71 and Q72 whose bases are connected commonly to the bases of the transistors Q65 and Q66 and whose collectors are connected to the power supply VCC, two sets of differential pair transistors Q73, Q74 and Q75, Q76 whose bases are connected to the emitters of the transistors Q71 and Q72, current sources I38 and I39 connected between the emitter common connection points of the differential pair transistors and the ground, a pnp transistor Q77 connected between the collector of the transistor Q67 and the power supply VCC and connected in diode connection, and a pnp transistor Q78 whose base is connected commonly to the base of the pnp transistor Q77 to form a current mirror circuit.

In the two sets of differential pair transistors Q73, Q74 and Q75, Q76, the bases of the transistors Q73 and Q76 are connected commonly to the emitter of the transistor Q72, and the bases of the transistors Q74 and Q75 are connected commonly to the emitter of the transistor Q71. The collectors of the transistors Q73 and Q75 are connected commonly and further connected to the power supply VCC. The collectors of the transistors Q74 and Q76 are connected commonly.

Output current is extracted from the collector of the transistor Q78. The output current is supplied as a control signal to the current source I35 of the hyperbolic function generation circuit 65 to control the current to flow from the current source I35. The gain of the nonlinearity compensation circuit depends, for example, upon the current of the current source I35 of the hyperbolic function generation circuit 65. Accordingly, the gain of the nonlinearity compensation circuit is varied by controlling the current of the current source I35 with the output current of the current control circuit 66.

In the current control circuit 66, the differential pair transistors Q73, Q74 and Q75, Q76 have transistor sizes of a ratio of n:m. Here, it is assumed that the transistors Q73 and Q75 have the size m while the transistors Q74 and Q76 have the size n.

The base potentials of the differential pair transistors formed with the size radio of n:m in this manner are equal to each other when the correction amount (compensation amount) of the nonlinearity compensation circuit is 0. In this instance, where the current flowing through each of the current sources I38 and I39 is represented by I, the current of 1/(n+m)×I flows through each those of the differential pair transistors which have the same size. Here, the base potential of the transistor Q73 and the base potential of the transistor Q76, and the base potential of the transistor Q74 and the base potential of the transistor Q75 are differential voltages diode-converted in accordance with the correction amounts (control voltages c+ and c−), respectively.

Since the base of the transistor Q73 and the base of the transistor Q76, and the base of the transistor Q74 and the base of the transistor Q75, are individually the same nodes, the base potential of the transistor Q73 and the base potential of the transistor Q76 vary together with each other. Similarly, the base potential of the transistor Q74 and the base potential of the transistor Q75 vary together with each other.

Then, due to the diode-conversion in accordance with the correction amount of the nonlinearity compensation circuit, if the base potential to the transistors Q73 and Q76 rises, then the base potential to the transistors Q74 and Q75 lowers. In other words, the collector currents of the transistors Q73 and Q76 increase while the collector currents of the transistors Q74 and Q75 decrease. If the difference between the potentials increases, then the current I flows to the collectors of the transistors Q73 and Q76 while the collector currents to the transistors Q74 and Q75 decrease to zero.

Here, since the collector currents of the transistor Q74 and the transistor Q76 are added to each other and extracted as an output current through the current mirror circuit formed form the transistors Q77 and Q78, a current of the maximum value I is obtained as the output current.

On the other hand, since the base potentials of all of the transistors are equal to each other when the correction amount of the nonlinearity compensation circuit is 0 as described hereinabove, the same current $$(=1/(n+m)\times I)$$

flows through each those of the differential pair transistors Q73, Q74, Q75 and Q76 which have the same size, that is, m/(n+m)×I flows through the transistors Q73 and Q75, and n/(n+m)×I flows through the transistors Q74 and Q76. Then, since the extracted current (output current) is the sum of the collector currents of the transistors Q74 and Q76, it is given by 2n(n+m)×I.

In order to facilitate understanding, if it is assumed that n=1 and m=7 as an example, then ⅞×I flows through the transistors Q73 and Q75 while ⅛×I flows through the transistors Q74 and Q76, respectively. Consequently, the extracted current is ¼×I.

On the other hand, if the base potential of the transistors Q73 and Q76 drops and the base potential of the transistors Q74 and Q75 rises conversely to the case of the description of operation above, then the collector currents of the transistors Q73 and Q76 soon become reduced to 0 while the current I flows to the collectors of the transistors Q74 and Q75. Then, since the extracted current is the sum of the collector currents of the transistors Q74 and Q75 similarly, it is given by the current I.

Figure 17:
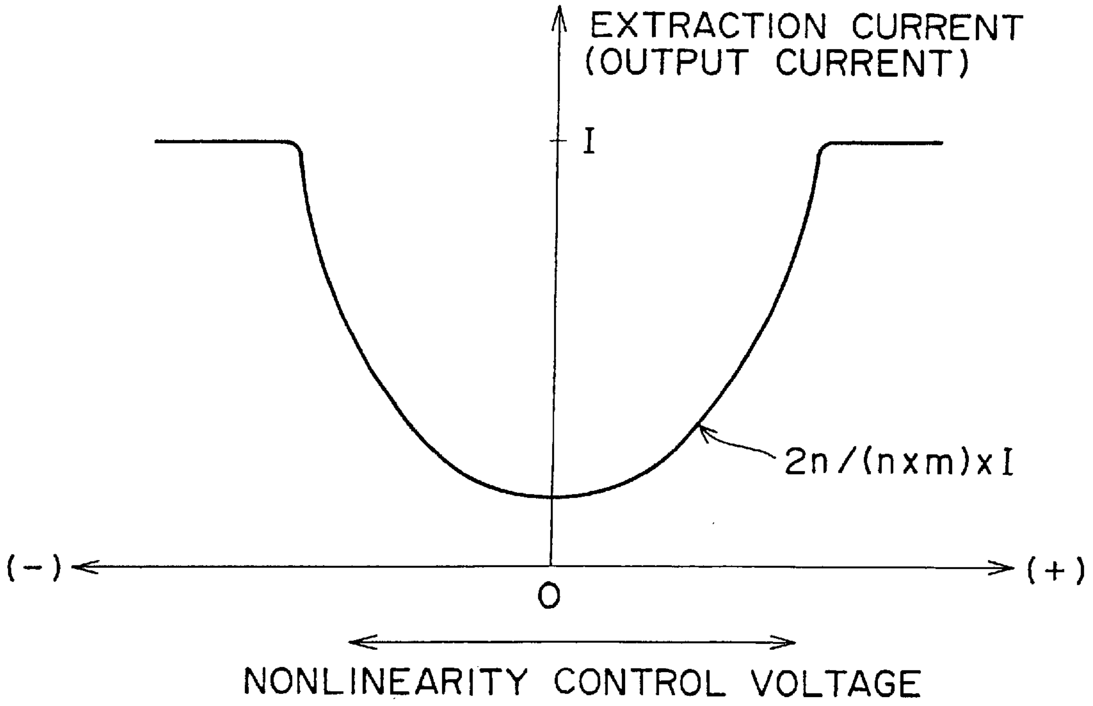
FIG. 17 is a diagram illustrating a current control characteristic of a current control circuit of the nonlinearity compensation circuit of FIG. 16.

In short, with the nonlinearity compensation circuit having the configuration described above, in whichever direction the correction amount moves from the value 0, output current which increases in any of the polarities can be extracted. A current control characteristic in this instance is illustrated in FIG. 17.

Where the current control circuit 66 is provided in the nonlinearity compensation circuit in this manner, since the current control circuit 66 can operate in accordance with a diode characteristic of the nonlinearity compensation circuit and arbitrarily produce nonlinear output current tuned with a gain variation upon nonlinearity compensation, gain adjustment can be performed so that the gain which is varied upon nonlinearity compensation may be cancelled by controlling the current of the current source I35 of the hyperbolic function generation circuit 65 with the output current of the current control circuit 66.

Further, different from an automatic gain control circuit of the feedback system, the current control circuit 66 does not include a loop of itself and is simple in circuit configuration. Therefore, a system can be constructed simply using the current control circuit 66. Further, the extracted current (output current) can be set arbitrarily depending upon the size ratio of two sets of differential pair transistors, and output currents of both polarities can be extracted.

It is to be noted that, while the nonlinearity compensation circuit of FIG. 16 is described in connection with an example wherein the size ratio n:m of the differential pair transistors is 1:7, this is a mere example, and the values of n and m can be set arbitrarily. Further, although it is described that two sets of differential pair transistors are used, the number of sets of differential pair transistors is not limited to this, but any other even number of sets such as four sets or more of differential pair transistors may be used. Further, although it is described that the gain adjustment is performed by controlling the current of the current source I35 of the hyperbolic function generation circuit 65, the gain adjustment may be performed at any portion only if the gain of the nonlinearity compensation circuit can be adjusted.

While the nonlinearity compensation circuits and the control circuits described above to which the present invention are applied use npn transistors, the transistors to be used are not limited to the npn transistor, and it is also possible to use pnp transistors to construct a nonlinearity compensation circuit and a control circuit according to the present invention.

While preferred embodiments of the present invention have been described using specific terms, such description is for illustrative purposes only, and it is to be understood that changes and variations may be made without departing from the spirit or scope of the following claims.

What is claimed is:

1. A nonlinearity compensation circuit, comprising:

compensation means for compensating for the nonlinearity of an input signal in response to a control signal; and characteristic provision means for providing an input/output characteristic represented by a function of $$y=(x+c)/(1+cx)$$

where x is the input signal, c is the control signal, and y is the output signal, and ≡x, c≡≦1.

2. A nonlinearity compensation circuit according to claim 1, wherein said characteristic provision means includes:

inverse hyperbolic function generation means for converting differential current corresponding to the input signal into a differential voltage which increases in proportion to an inverse hyperbolic function;

offset provision means for providing an offset corresponding to the control signal to the differential voltage outputted from said inverse hyperbolic function generation means; and hyperbolic function generation means for converting the differential voltage to which the offset has been provided by said offset provision means into a signal which increases in proportion to a hyperbolic function and outputting the resulting signal as the output signal of said nonlinearity compensation circuit.

3. A nonlinearity compensation circuit according to claim 2, further comprising offset cancellation means for cancelling a DC offset which otherwise appears in the signal obtained by the conversion of said hyperbolic function generation means.

4. A nonlinearity compensation circuit according to claim 2, further comprising gain correction means for correcting a gain variation which otherwise appears upon the nonlinearity compensation by said compensation means.

5. A nonlinearity compensation circuit according to claim 4, wherein said gain correction means includes differential pair transistors having different sizes for receiving the differential voltage obtained by the conversion of said inverse hyperbolic function generation means as a differential input thereto and performs gain adjustment of the differential voltage in accordance with output current of said differential pair transistors.

6. A nonlinearity compensation circuit according to claim 5, wherein said gain correction means includes a plurality of sets of differential pair transistors connected such that positive phase outputs and negative phase outputs of said differential pair transistors are added to obtain the output current.

7. A nonlinearity compensation circuit according to claim 1, wherein the input signal is a read signal read from a recording medium.

8. A nonlinearity compensation circuit according to claim 7, wherein the read signal has second order distortion.

9. A control circuit for a nonlinearity compensation circuit which compensates for the nonlinearity of an input signal, comprising:

measurement means for measuring a first time and a second time within which the waveform of the input signal has a positive value and a negative value with respect to a reference level, respectively; and control means for controlling said nonlinearity compensation circuit based on a difference between the first time and the second time measured by said measurement means.

10. A control circuit for a nonlinearity compensation circuit according to claim 9, wherein said control means controls said nonlinearity compensation circuit so that the difference between the first time and the second time measured by said measurement means may be reduced to zero.

11. A control circuit for a nonlinearity compensation circuit according to claim 9, wherein said control means adjusts a bias level for the input signal so that the difference between the first time and the second time measured by said measurement means may be reduced to zero and controls said nonlinearity compensation circuit so that the waveform of the input signal may have a positive side amplitude and a negative side amplitude equal to each other with respect to the bias level.

12. A control circuit for a nonlinearity compensation circuit according to claim 9, wherein said nonlinearity compensation circuit has an input/output characteristic represented by a function of $$y=(x+c)/(1+cx)$$

where x is the input signal, c is the control signal, and y is the output signal, and ≡x, c≡≦1.

13. A control circuit for a nonlinearity compensation circuit according to claim 12, wherein an output signal of said nonlinearity compensation circuit is fed back to control said nonlinearity compensation circuit.

14. A control circuit for a nonlinearity compensation circuit according to claim 13, wherein said measurement means determines a time average value of the waveform of the output signal of said nonlinearity compensation circuit, and said control means integrates a difference between a time within which the waveform of the output signal has a value higher than the time average value determined by said measurement means and another time within which the waveform of the output signal has a value lower than the time average value and controls said nonlinearity compensation circuit based on a result of the integration.

15. A control circuit for a nonlinearity compensation circuit according to claim 14, wherein said measurement means includes a capacitor connected to an output terminal of said nonlinearity compensation circuit for AC coupling said nonlinearity compensation circuit to said measurement means.

16. A control circuit for a nonlinearity compensation circuit according to claim 9, wherein the input signal is a read signal read from a recording medium.

17. A control circuit for a nonlinearity compensation circuit according to claim 16, wherein the read signal has second order distortion.

18. A nonlinearity compensation method for compensating for the nonlinearity of an input signal in response to a control signal, comprising the step of providing an input/output characteristic represented by a function of $$y=(x+c)/(1+cx)$$

where x is the input signal, c is the control signal, and y is the output signal, and ≡x, c≡≦1.

19. A control method for a nonlinearity compensation circuit which compensates for the nonlinearity of an input signal, comprising the steps of:

measuring a first time and a second time within which the waveform of the input signal has a positive value and a negative value with respect to a reference level, respectively; and controlling said nonlinearity compensation circuit based on a difference between the first time and the second time measured by said measuring step.

20. A control method for a nonlinearity compensation circuit according to claim 19, wherein said nonlinearity compensation circuit is controlled so that the difference between the first time and the second time measured by said measuring step may be reduced to zero.

21. A control method for a nonlinearity compensation circuit according to claim 19, wherein a bias level for the input signal is adjusted so that the difference between the first time and the second time measured by said measuring step may be reduced to zero, and said nonlinearity compensation circuit is controlled so that the waveform of the input signal may have a positive side amplitude and a negative side amplitude equal to each other with respect to the bias level.

22. A recording and/or playback apparatus, comprising:

reading means for reading recorded information from a recording medium;

a nonlinearity compensation circuit for compensating for the nonlinearity of a read signal read by said reading means; and a control circuit for controlling a compensation amount of said nonlinearity compensation circuit;

said control circuit including measurement means for measuring a first time and a second time within which the waveform of the read signal has a positive value and a negative value with respect to a reference level, respectively, and control means for controlling said nonlinearity compensation circuit based on a difference between the first time and the second time measured by said measurement means.

23. A recording and/or playback apparatus according to claim 22, wherein said control means controls said nonlinearity compensation circuit so that the difference between the first time and the second time measured by said measurement means may be reduced to zero.

24. A recording and/or playback apparatus according to claim 22, wherein said control means adjusts a bias level for the read signal so that the difference between the first time and the second time measured by said measurement means may be reduced to zero and controls said nonlinearity compensation circuit so that the waveform of the input signal may have a positive side amplitude and a negative side amplitude equal to each other with respect to the bias level.

25. A recording and/or playback apparatus according to claim 22, wherein said nonlinearity compensation circuit has an input/output characteristic represented by a function of $$y=(x+c)/(1+cx)$$

where x is the input signal, c is the control signal, and y is the output signal, and ≡x, c≡≦1.

26. A recording and/or playback apparatus according to claim 25, wherein said nonlinearity compensation circuit includes:

inverse hyperbolic function generation means for converting differential current corresponding to the read signal into a differential voltage which increases in proportion to an inverse hyperbolic function;

offset provision means for providing an offset corresponding to the control signal to the differential voltage outputted from said inverse hyperbolic function generation means; and hyperbolic function generation means for converting the differential voltage to which the offset has been provided by said offset provision means into a signal which increases in proportion to a hyperbolic function.

27. A recording and/or playback apparatus according to claim 26, wherein said nonlinearity compensation circuit further includes offset cancellation means for cancelling a DC offset which otherwise appears in the signal obtained by the conversion of said hyperbolic function generation means.

28. A recording and/or playback apparatus according to claim 26, wherein said nonlinearity compensation circuit further includes gain correction means for correcting a gain variation which otherwise appears upon the nonlinearity compensation by said nonlinearity compensation circuit.

29. A recording and/or playback apparatus according to claim 22, wherein the read signal has second order distortion.

* * * * *

UNITED STATES PATENT AND TRADEMARK OFFICE

CERTIFICATE OF CORRECTION

PATENT NO. : 6,597,650 B2

DATED : July 22, 2003

INVENTOR(S) : Masuyuki Katakura et al.

It is certified that error appears in the above-identified patent and that said Letters Patent is hereby corrected as shown below:

<u>Column 20,</u>

Line 13, replace “step may be” with -- may be --.

Signed and Sealed this

Ninth Day of December, 2003

JAMES E. ROGAN

*Director of the United States Patent and Trademark Office*